(12) United States Patent
Nitta et al.

(10) Patent No.: US 10,693,329 B2
(45) Date of Patent: Jun. 23, 2020

(54) POLYPHASE CLAW POLE MOTOR AND STATOR OF THE POLYPHASE CLAW POLE MOTOR

(71) Applicant: NSK Ltd., Tokyo (JP)

(72) Inventors: Isamu Nitta, Fujisawa (JP); Hiroshi Araya, Fujisawa (JP); Nobuo Ukai, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/493,175

(22) PCT Filed: May 10, 2018

(86) PCT No.: PCT/JP2018/018227
§ 371 (c)(1),
(2) Date: Sep. 11, 2019

(87) PCT Pub. No.: WO2018/207897
PCT Pub. Date: Nov. 15, 2018

(65) Prior Publication Data
US 2020/0083762 A1 Mar. 12, 2020

(30) Foreign Application Priority Data

May 11, 2017 (JP) ................................ 2017-094363

(51) Int. Cl.
*H02K 1/14* (2006.01)
*H02K 1/18* (2006.01)
*H02K 1/02* (2006.01)
*H02K 3/04* (2006.01)

(52) U.S. Cl.
CPC ............... *H02K 1/145* (2013.01); *H02K 1/02* (2013.01); *H02K 1/185* (2013.01); *H02K 3/04* (2013.01)

(58) Field of Classification Search
CPC .......... H02K 1/145; H02K 1/02; H02K 1/185; H02K 3/04
USPC ........................................................ 310/257
See application file for complete search history.

(56) References Cited

U.S. PATENT DOCUMENTS

| | | | |
|---|---|---|---|
| 2005/0012427 A1* | 1/2005 | Seki ....................... | H02K 1/145 310/257 |
| 2006/0208602 A1 | 9/2006 | Enomoto et al. | |
| 2007/0138900 A1* | 6/2007 | Imai ....................... | H02K 1/145 310/257 |
| 2014/0203677 A1 | 7/2014 | Takemoto et al. | |

(Continued)

FOREIGN PATENT DOCUMENTS

| | | |
|---|---|---|
| JP | 2008-236978 A | 10/2008 |
| JP | 4878183 A | 2/2012 |
| JP | 2014-233189 A | 12/2014 |

(Continued)

OTHER PUBLICATIONS

International Search Report for PCT/JP2018/018227 dated Jul. 3, 2018 [PCT/ISA/210].
Decision to Grant for JP 2019-517708 dated Jun. 5, 2019.

*Primary Examiner* — Alex W Mok
(74) *Attorney, Agent, or Firm* — Sughrue Mion, PLLC

(57) ABSTRACT

A stator of a polyphase claw pole motor includes: a compressed-powder member including a compression molded product of magnetic powder; and a metal member. At least claws of the claw pole of the stator are constituted by the compressed-powder member.

2 Claims, 32 Drawing Sheets

(56) References Cited

U.S. PATENT DOCUMENTS

2015/0048708 A1* 2/2015 Nord .................. H02K 21/145
310/156.56
2016/0276880 A1 9/2016 Ueda et al.

FOREIGN PATENT DOCUMENTS

| JP | 2015-029401 A | 2/2015 |
| JP | 2015-061385 A | 3/2015 |
| JP | 2015-154555 A | 8/2015 |
| JP | 2016-178786 A | 10/2016 |

* cited by examiner

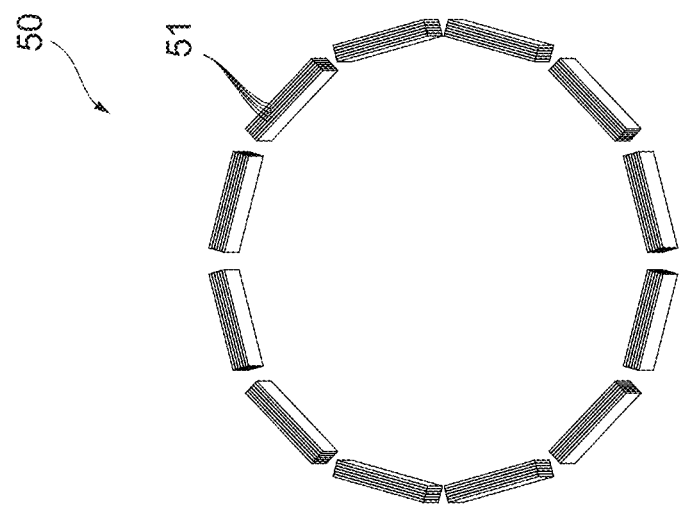
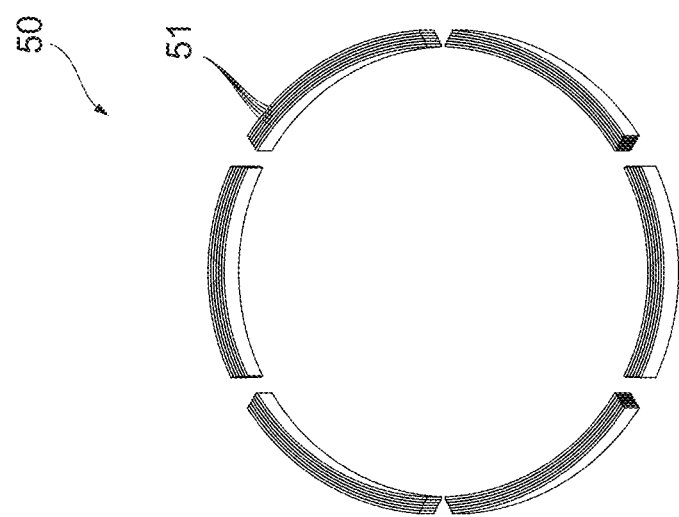
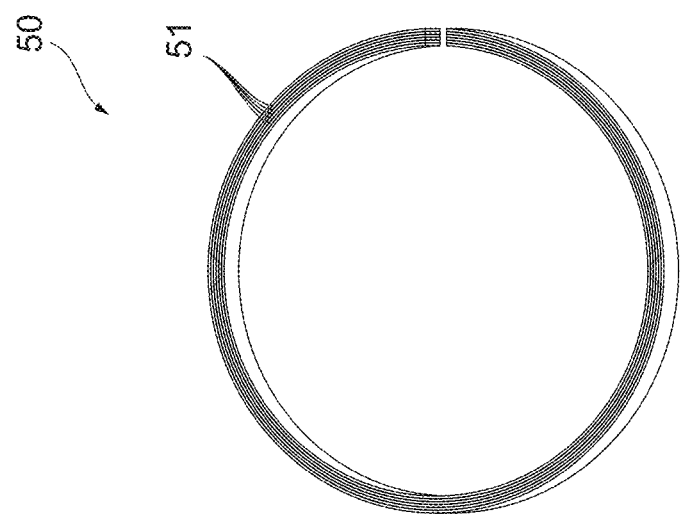

POLYPHASE CLAW POLE MOTOR AND STATOR OF THE POLYPHASE CLAW POLE MOTOR

CROSS REFERENCE TO RELATED APPLICATIONS

This application is a National Stage of International Application No. PCT/JP2018/018227 filed May 10, 2018, claiming priority based on Japanese Patent Application No. 2017-094363 filed May 11, 2017.

TECHNICAL FIELD

The present invention relates to a polyphase claw pole motor and a stator of such a polyphase claw pole motor.

BACKGROUND ART

Conventionally, a polyphase claw pole type motor has been known, wherein claws of claw poles, a radial yoke part, and an outer peripheral yoke are formed of compressed-powder cores, with a toroidal coil being axially sandwiched therebetween (see, Patent Document 1, for example). The motor having the above-mentioned configuration increases the cross-sectional area of a magnetic path as compared to claws formed by bending an iron plate.

Advantageously the compressed-powder core typically has three-dimensional and non-directional magnetic properties. Claws and radial yoke parts near the claws desirably extend in three dimensions, and so the use of such a compressed-powder core for them leads to advantages in terms of magnetic properties.

CITATION LIST

Patent Document

Patent Document 1: JP 4878183 B

SUMMARY

Technical Problem

The material cost for the polyphase claw pole motor as in Patent Document 1 is high.

The present invention aims to provide a polyphase claw pole motor and a stator of such a polyphase claw pole motor at low material cost.

Solution to Problem

A stator of a polyphase claw pole motor according to one aspect of the present invention includes: a compressed-powder member including a compression molded product of magnetic powder; and a metal member; wherein at least claws of a claw pole of the stator are constituted by the compressed-powder member. A polyphase claw pole motor according to another aspect of the present invention includes the stator as stated above.

The polyphase claw pole motor and the stator of the polyphase claw pole motor as stated above include parts other than the claws of the claw pole that are not a compressed-powder member, and so reduces the material cost while keeping the advantages for magnetic characteristics of the compressed-powder member.

In the polyphase claw pole motor as stated above, a part or the entire of an annular part radially outward of the claws of the claw pole may be constituted by the metal member.

In the polyphase claw pole motor as stated above, a part or the entire of an annular part radially outward of the claws of the claw pole may be constituted by the compressed-powder member.

The polyphase claw pole motor as stated above may include a plurality of the annular parts that are disposed in an axial direction of the polyphase claw pole motor.

The polyphase claw pole motor as stated above may further include a magnetic-path defining member to form a magnetic path in the axial direction between the plurality of annular parts.

In the polyphase claw pole motor as stated above, the magnetic-path defining member may include an outer peripheral core disposed radially outward of the annular part.

In the polyphase claw pole motor as stated above, the outer peripheral core may be formed of a soft-magnetic sheet.

In the polyphase claw pole motor as stated above, the soft-magnetic sheet may be formed of laminated sheets stacked in a circumferential direction of the polyphase claw pole motor.

In the polyphase claw pole motor as stated above, the claw pole may have a flat surface on an outer peripheral surface, and the outer peripheral core may have a contact surface extending in the axial direction to be in contact with the flat surface, the contact surface and the outer peripheral surface of the claw pole having mutually engaging shapes.

In the polyphase claw pole motor as stated above, the outer peripheral core may extend in the axial direction as well as in a radial direction, and the outer peripheral core may have the contact surface on an inner peripheral surface in the radial direction.

In the polyphase claw pole motor as stated above, the magnetic-path defining member may include a core disposed between the annular parts of the claw poles.

In the polyphase claw pole motor as stated above, the core may be formed of a wound soft-magnetic sheet.

In the polyphase claw pole motor as stated above, the core may be disposed for each phase of the stator.

In the polyphase claw pole motor as stated above, the core may be formed of a soft-magnetic sheet extending over all of the phases of the stator.

In the polyphase claw pole motor as stated above, the claws each may have a separated and independent structure.

In the polyphase claw pole motor as stated above, the claws and the annular part constituted by a metal member may be integrally formed.

The polyphase claw pole motor as stated above may further include a holder to hold the claws.

In the polyphase claw pole motor as stated above, the holder may have notches to determine positions of the claws.

The polyphase claw pole motor as stated above may further include a positioning member to place each of the claw poles at a predetermined position.

In the polyphase claw pole motor as stated above, the positioning member may include a recess for positioning to define a circumferential position of each of the claws of the claw pole.

In the polyphase claw pole motor as stated above, the motor may include a coil in a form of alpha winding for each phase of the stator.

In the polyphase claw pole motor as stated above, the coil may include a wire wound in a flatwise manner.

Advantageous Effects of Invention

The present invention provides a polyphase claw pole motor and a stator of such a polyphase claw pole motor at low material cost.

BRIEF DESCRIPTION OF DRAWINGS

FIG. 21A shows an annular laminate core (outer peripheral core) formed by stamping a magnetic steel sheet and stacking the magnetic steel sheets in the axial direction that is a part (outer peripheral part) of a radial magnetic-path defining part, FIGS. 21B and 21C show an annular core formed by integrating a plurality of circumferentially segmented magnetic steel sheets (or blocks of the laminate core).

DESCRIPTION OF EMBODIMENTS

Figure 1:
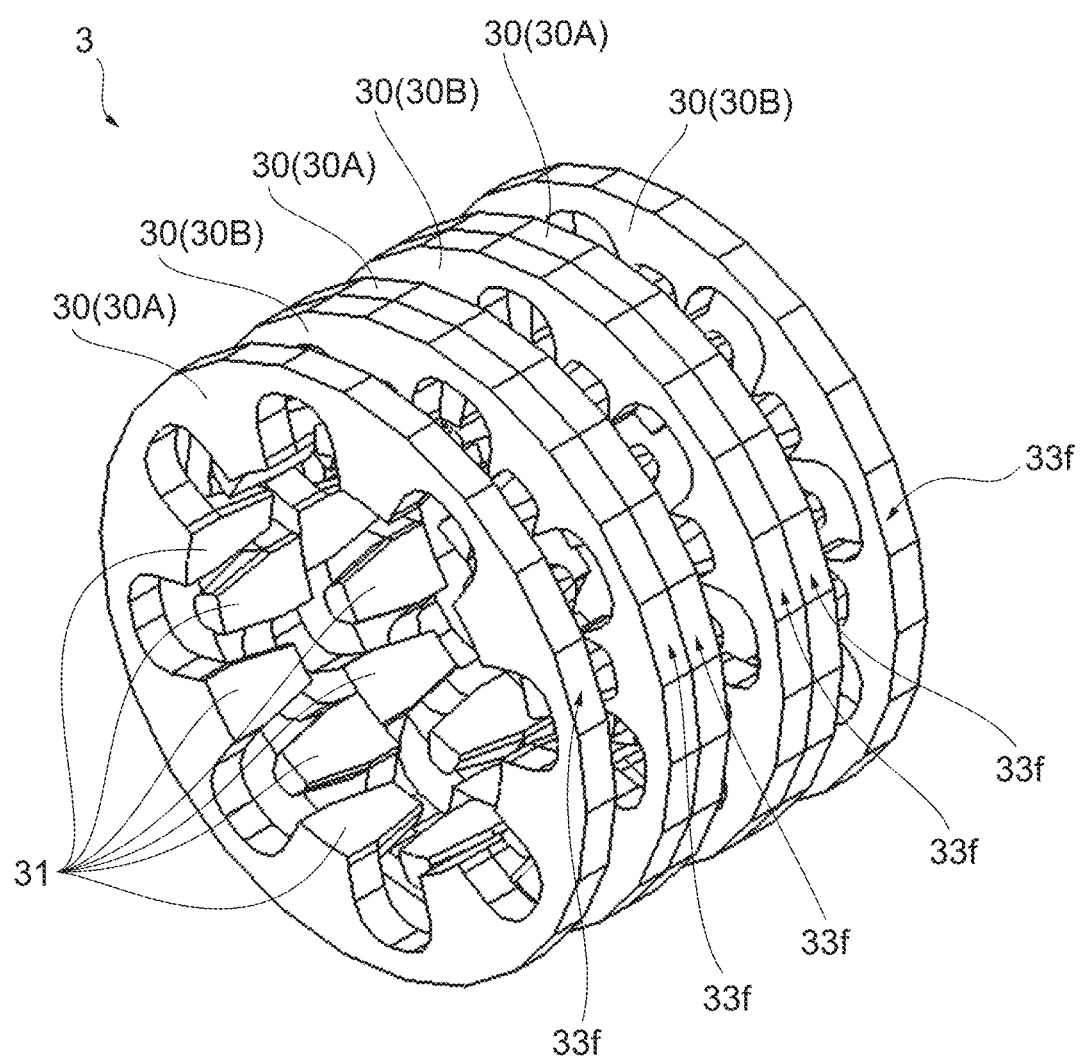
FIG. 1 is a perspective view showing an inner peripheral stator part formed by joining three pairs of claw poles.

Preferred embodiments of a polyphase claw pole motor 1 including the combination of compressed-powder cores and other cores will be described below with reference to the attached drawings.

The polyphase claw pole motor 1 according to the present invention has a stator 2 including a compressed-powder member constituted by a compression molded product of magnetic powder and a metal member. Such a polyphase claw pole motor 1 has an improved cross-sectional area of a magnetic path as compared with a stator including a metal member as a whole. This polyphase claw pole motor 1 includes at least claws 31 of claw poles 30 in the stator 2 that are compressed-powder members. Such a polyphase claw pole motor 1 reduces the material cost because a part or all of the claw poles 30 other than the claws 31 is not a compressed-powder member, while keeping the advantages for magnetic characteristics from the compressed-powder member. The following describes several polyphase claw pole motors 1 that are different in the configuration of the claw poles, the magnetic-path defining members, and the like by way of some embodiments.

First Embodiment

A polyphase claw pole motor 1 according to this embodiment includes a stator (stator yoke) 2, a toroidal coil 4, a shaft (rotator) 11, and so on. The stator 2 includes: an inner peripheral stator part 3 constituted by claw poles 30; and an outer peripheral stator part 5 constituted by outer peripheral cores (they may be called outer peripheral yokes) 50. The claw poles 30 are each formed as a molded product obtained by compressing magnetic powder while electrically insulating the surface of such powder, and the outer peripheral cores 50 are each formed of soft magnetic laminated plates (the laminate of non-directional magnetic steel sheets 51).

Figure 4:
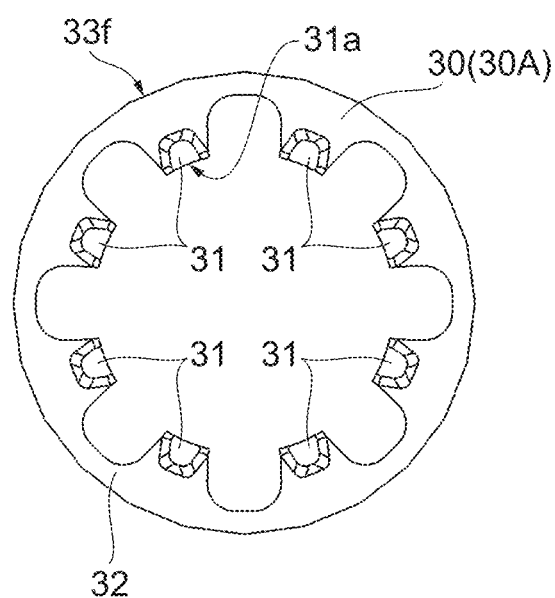
FIG. 4 is a diagram showing a configuration of one of claw poles as a pair according to a first embodiment of the present invention.
Figure 5:
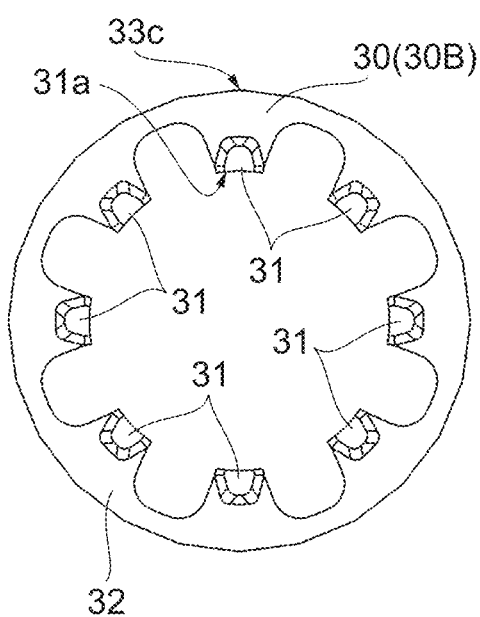
FIG. 5 is a diagram showing a configuration of the other one of the claw poles as a pair according to the first embodiment of the present invention.

While a conventional claw pole has an annular portion formed as a compressed-powder core, a claw pole of the present embodiment includes, as a part of this annular portion on the outer periphery, a part (protrusion 50*a*) of an outer peripheral core (laminated core 50) that is non-directional magnetic steel sheets 51 stacked in the tangential direction (the circumferential direction of the polyphase claw pole motor 1). The polyphase claw pole motor 1 of the present embodiment has claw poles 30, and each of the claw poles 30 includes claws 31, pole surfaces 31*a* and an annular part 32 (see FIGS. 1, 4 and 5, for example).

The claws 31 extend in an axial direction (which refers to the direction of a rotation axis of the shaft 11) and define claw poles. Each claw 31 has the pole surface 31*a* that faces an outer peripheral surface of a rotor core with a predetermined minute gap therebetween, the rotor core rotating with the shaft 11. A single claw pole 30 includes a plurality of these claws (e.g., eight claws) 31 (see FIGS. 1 and 4, for example). The annular part 32 is an annular portion extending radially outwardly from the claws 31 (on the outer periphery) of the claw pole 30.

The plurality of claws 31 and the annular part 32 are formed as a molded product (compressed-powder core) obtained by compressing magnetic powder while electrically insulating the surface of the powder in order to increase a cross-sectional area of the magnetic path in the polyphase claw pole motor 1.

The polyphase claw pole motor 1 according to the present embodiment includes an outer peripheral stator part 5 made up of a plurality of outer peripheral cores 50. The plurality of outer peripheral cores 50 is circumferentially arranged at regular intervals on the outer side of the inner peripheral stator part 3 (see FIG. 3).

Figure 2:
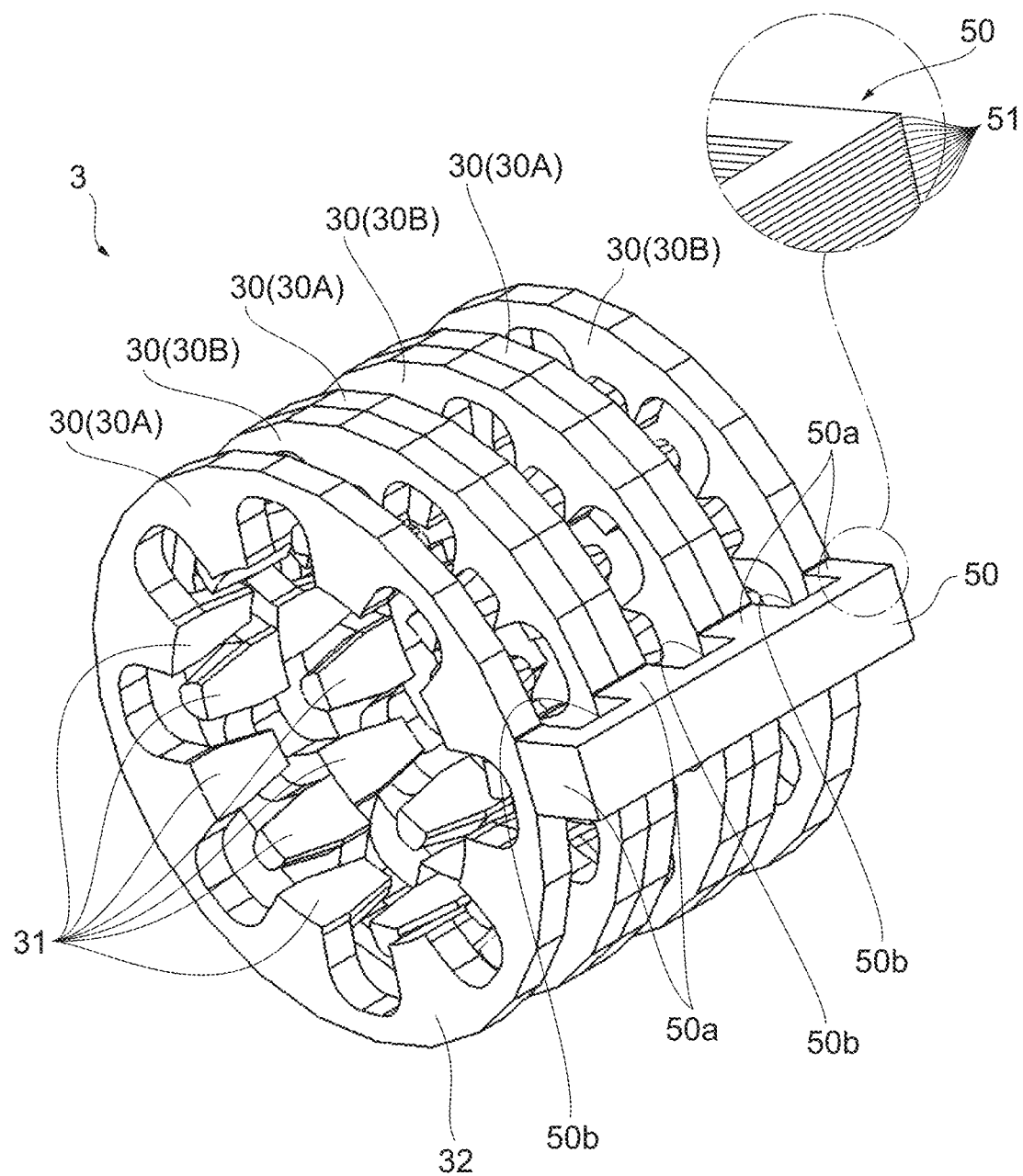
FIG. 2 is a perspective view showing one outer peripheral core abutting with the inner peripheral stator part shown in FIG. 1 in a close contact manner.

Each of the outer peripheral cores 50 has a part (projections 50*a*) extending radially inwardly so as to define grooves (recesses) 50*b* to receive the toroidal coils 4 when these outer peripheral cores 50 are disposed on the outer side of the inner peripheral stator part 3 (see FIG. 2). These radially extending parts of the outer peripheral cores 50 overlap the toroidal coils 4 received in the grooves (recesses) 50*b* (see FIG. 3).

The outer peripheral cores 50 extend in the axial direction as well, and preferably have a shape that comes in contact with the plurality of claw poles 30. The present embodiment has the outer peripheral cores 50 each having a comb-like or fork-like shape formed of four projections 50*a* and three grooves 50*b* (see FIG. 2). Such outer peripheral cores 50 each have a length corresponding to the axial length of three pairs of claw poles 30 including six claw poles for three phases, each pair including two opposed claw poles 30 for a single phase (see FIG. 2). Sharing these outer peripheral cores 50 with a plurality of phases (three phases in the present embodiment) of the claw poles 30 reduces the number of components and simplifies the structure and the assembly.

Each of the outer peripheral cores (magnetic-path defining member) 50 is a laminate core formed by stacking a plurality of comb-like or fork-like thin magnetic steel sheets 51 (see the part surrounded by the circle in FIG. 2). While a conventional stator yoke is an integrally formed as a compressed-powder core, the present embodiment includes a part of the annular part and a part of the outer peripheral yoke of the conventional stator yoke, i.e., a part other than around claw-shaped portions that is a laminate core formed by stacking the non-directional magnetic steel sheets 51 in the tangential direction in a transverse section. In this way, the present embodiment enables a high-output and low-loss polyphase claw pole motor 1 at a low material cost.

In other words, a claw pole of the present embodiment includes a part capable of effectively increasing the interlinkage magnetic flux that is a core including the non-directional magnetic steel sheets 51 instead of a compressed-powder core that has poor magnetic properties and which is likely to cause a low output, a high core loss and a high material cost. In this way, the present embodiment enables the polyphase claw pole motor 1 satisfying both a high output and a low cost at a high level.

The outer periphery of each claw pole 30 preferably has a polygonal shape with flat surfaces which are to be in contact with the outer peripheral cores 50. If an inner peripheral surface of the outer peripheral core 50 including the laminate core of the magnetic steel sheets 51 as described above is a curved surface like an outer peripheral surface of a cylinder, the magnetic steel sheets 51 have to be arranged so as to form steps (displaced from each other). This causes difficulty in bringing such a laminate core in close contact with the outer peripheral surfaces of the claw poles 30 without gaps. On the contrary, flat surfaces on the outer periphery of the claw poles 30 come in close contact with the inner peripheral surface of the outer peripheral cores 50 without gaps.

For such a configuration having a polygonal-shaped outer periphery of each claw pole 30, when the number of phases of the polyphase claw pole motor 1 is three, the outer periphery of the claw pole 30 preferably has a polygonal shape having sides in number that is three times the number of the claws 31. In one example, the present embodiment has two types of claw poles 30, each having eight claws 31 and an outer periphery of a regular 24-gon (or twenty-four sided polygon). The two types of claw poles 30 include: a claw pole 30A in which a portion on the radially outer side (rear side) of each claw 31 is a flat surface 33*f* including a side of the polygon (see FIG. 4) and a claw pole 30B in which a portion on the radially outer side of each claw 31 is a corner 33*c* of the polygon (a corner between the flat surfaces 33*f*) (see FIG. 5). These claw poles 30A and 30B as a pair are opposed to be combined with each other for a single phase while displacing 22.5° in the circumferential direction. Three pairs of such claw poles 30A and 30B in total are overlapped while displacing one by one by an electrical angle of 120° or a mechanical angle of 15° so as to form three-phrase claw poles 30. This configuration allows the projections 50*a* of the outer peripheral cores 50 shared with the three-phase claw poles 30 to come into close contact with the outer-peripheral flat surfaces 33*f* of all of the claw poles 30 without gaps (see FIGS. 2 and 3).

The toroidal coil 4 is arranged on the outer side of the claw poles 30 and on the inner side of the outer peripheral cores 50. The polyphase claw pole motor 1 of the present embodiment includes three toroidal coils 4 that are arranged at regular intervals in the axial direction so as to correspond to the phases of the claw poles 30 (see FIG. 3). Each toroidal coil 4 is sandwiched between the projections 50*a* in the axial direction and is enclosed by the claw poles 30 and the outer peripheral cores 50 in the radial direction.

Figure 3:
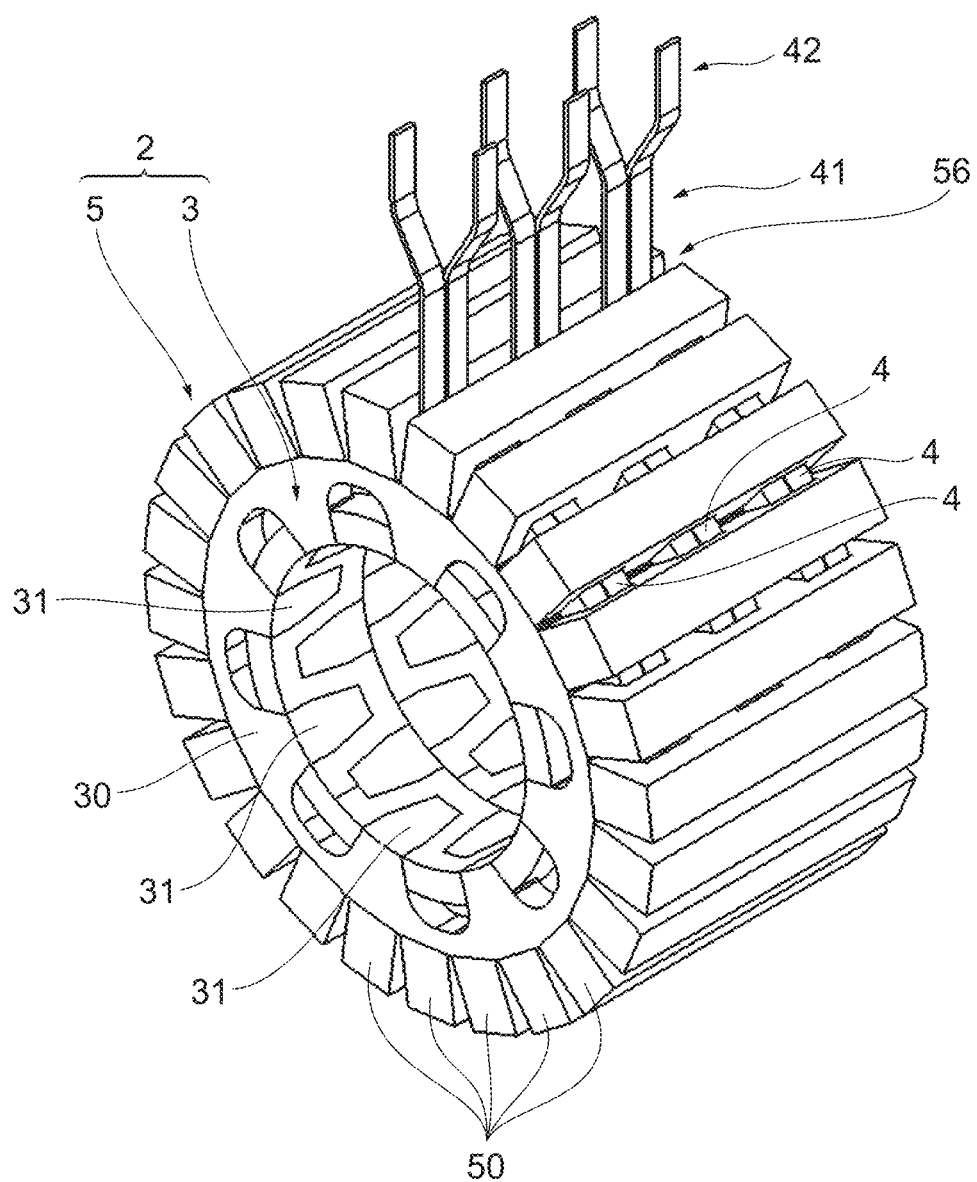
FIG. 3 is a perspective view showing a stator in which all outer peripheral cores are arranged around the inner peripheral stator part and wire ends of toroidal coils are drawn out through the outer peripheral cores.

The stator 2 is formed of twenty-four outer peripheral cores 50 in total that are circumferentially arranged around the inner peripheral stator part 3, and is formed of wires 41 of the toroidal coils 4 having ends 42 that are drawn out from a gap 56 between the outer peripheral cores 50 (see FIG. 3). This gap to take out the wires 41 extends in the axial direction.

Figure 6:
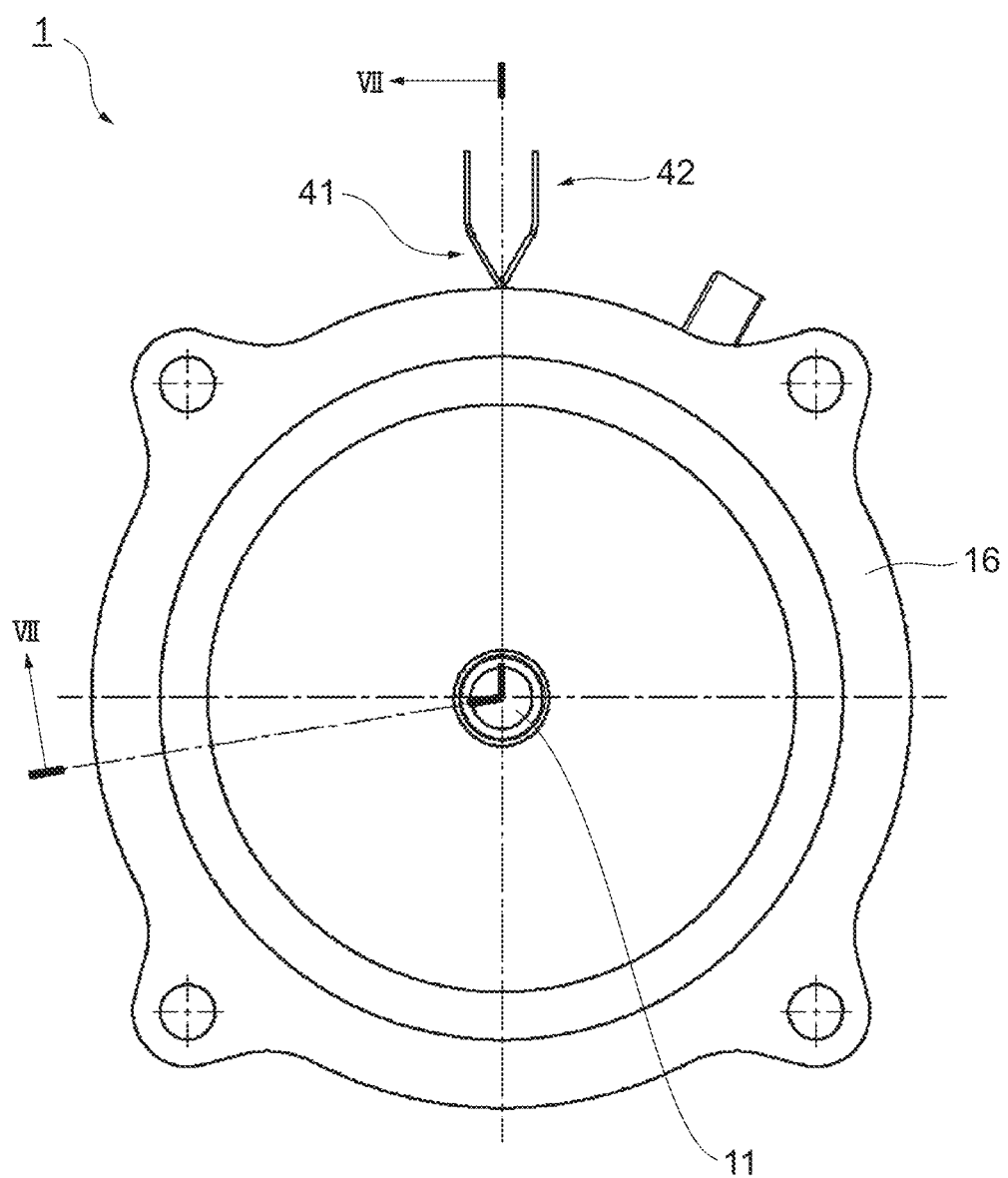
FIG. 6 is a front view of a polyphase claw pole motor.
Figure 7:
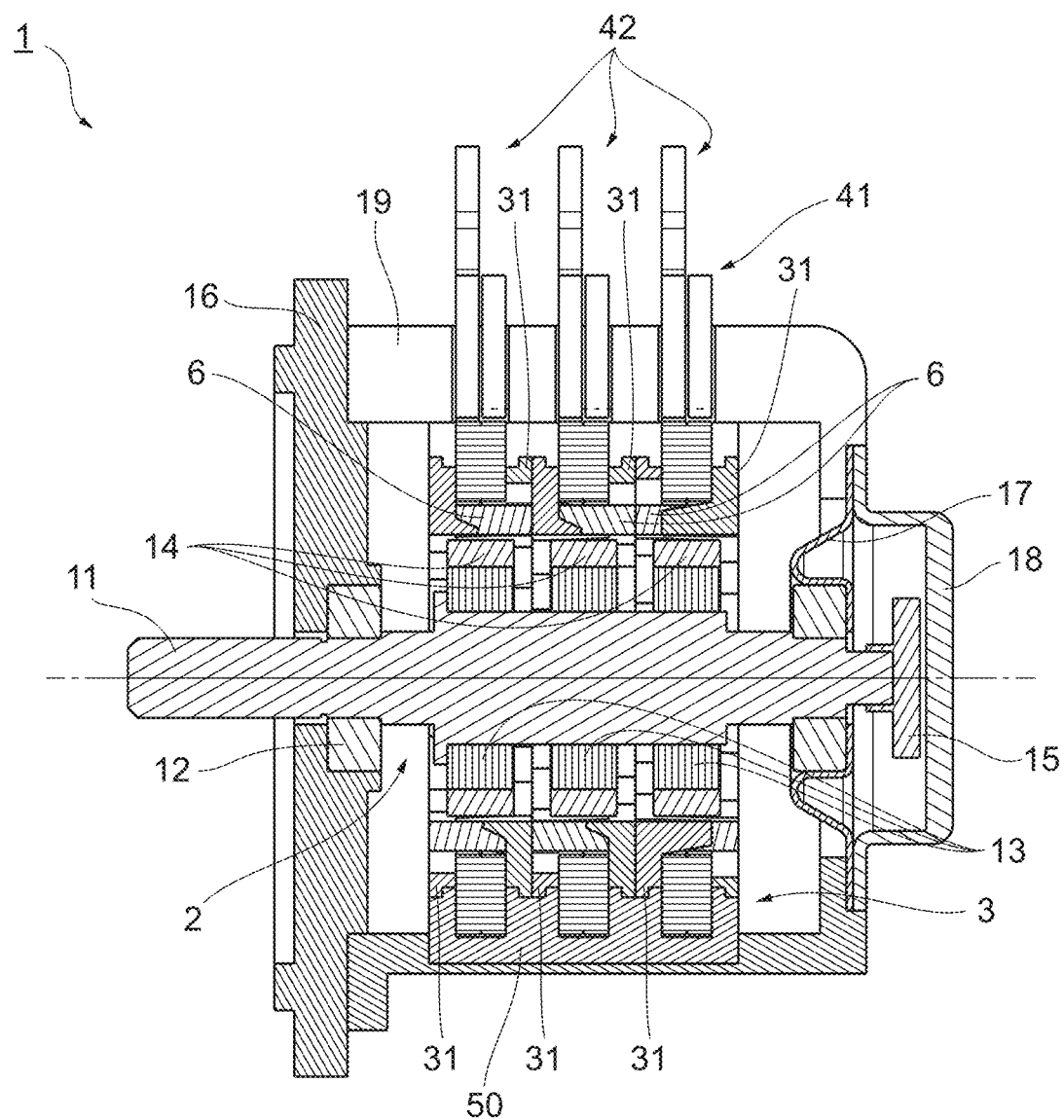
FIG. 7 is a diagram showing a cross-sectional structure taken along line VII-VII of FIG. 6.
Figure 8:
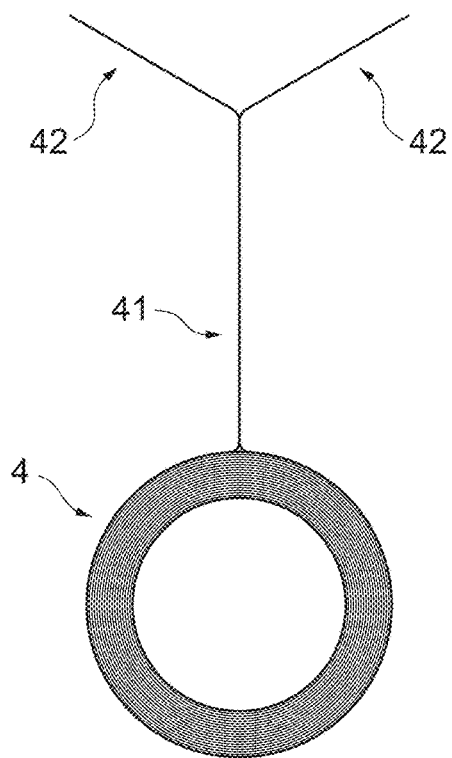
FIG. 8 is a front view showing a toroidal coil formed by alpha winding.
Figure 9:
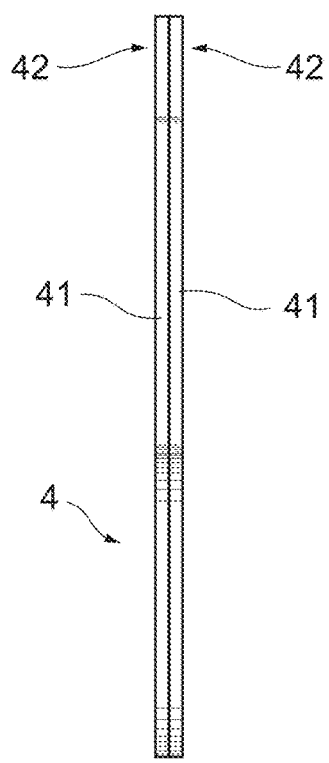
FIG. 9 is a side view showing the toroidal coil formed by alpha winding.
Figure 10:
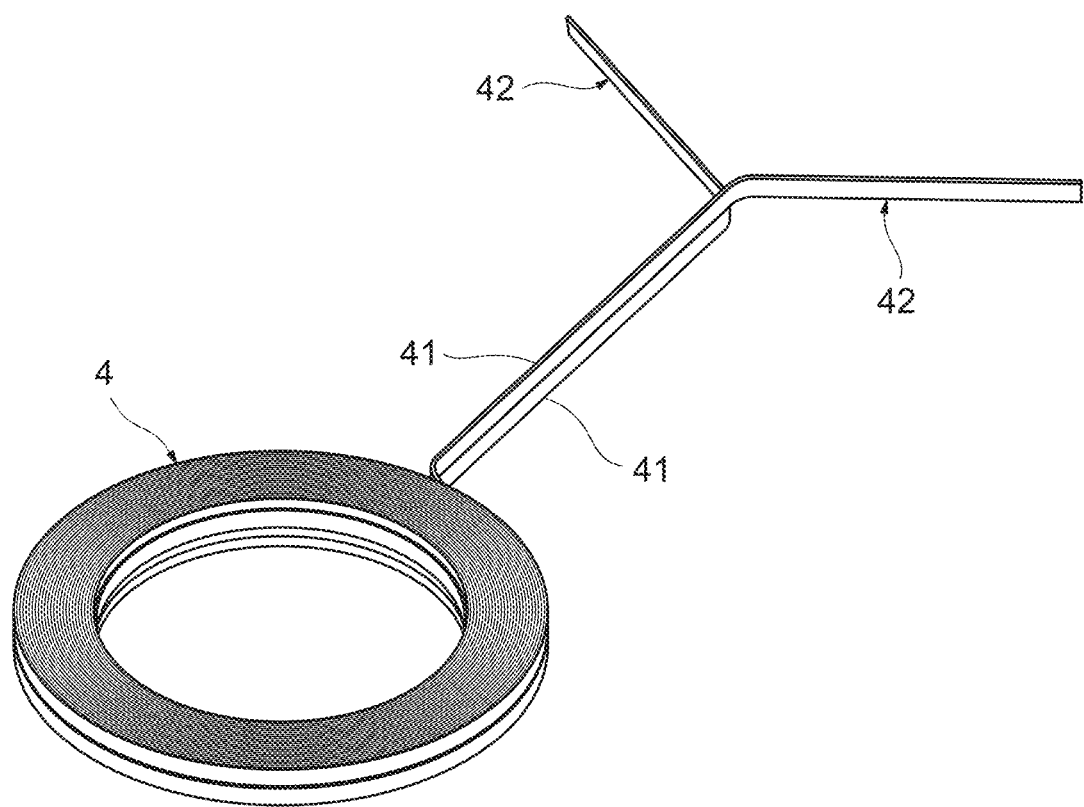
FIG. 10 is a perspective view showing the toroidal coil formed by alpha winding.
Figure 11:
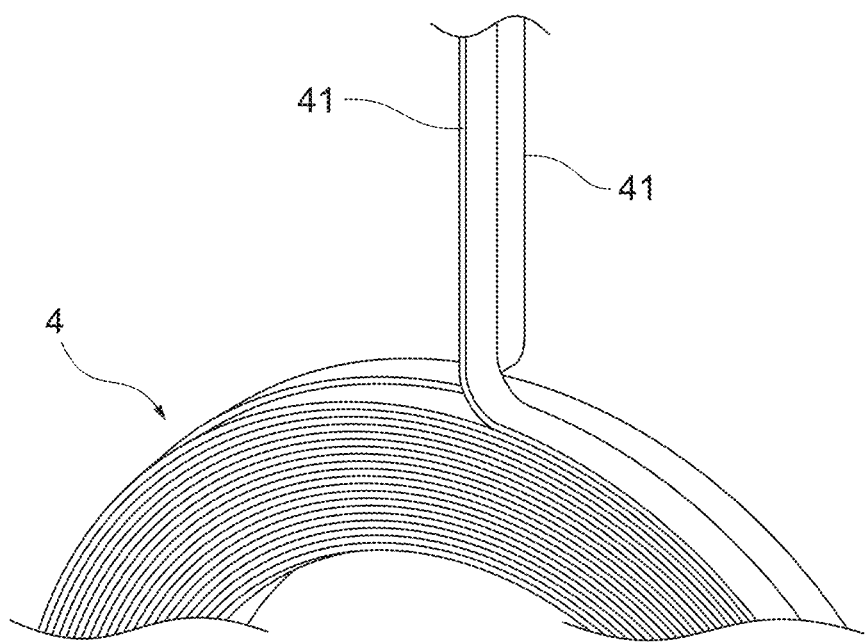
FIG. 11 is an enlarged perspective view showing a structure in the vicinity of both wire ends of the toroidal coil formed by alpha winding.

FIG. 6 and FIG. 7 show a polyphase claw pole motor 1 including the stator 2 having the above-described configuration. Reference numerals in these drawing denote as follows. Reference numerals 12 denotes a bearing, 13 denotes a rotor core, 14 denotes a permanent magnet, 15 denotes a sensor magnet, 16 denotes a front bracket, 17 denotes a rear bracket, 18 denotes a sensor, and 19 denotes a resin mold. Reference numeral 6 denotes an interposed member interposed between the claw poles 30 and 30 as a pair.

As described above, instead of the annular part (corresponding to the outer peripheral portion) in the conventional claw pole that is a compressed-powder core, the present embodiment includes a part of the annular part that is the laminate core of the non-directional magnetic steel sheets 51 stacked in the tangential direction and includes the toroidal coil 4 that is enclosed in the axial direction and the radial direction. Such a structure of the present embodiment achieves a high-output and low-core loss polyphase claw pole motor 1 at a low material cost.

Each of the outer peripheral cores 50 as the laminate core has substantially linear side surfaces in the stacking direction, which serve as a magnetic-flux inflow surface and a magnetic-flux outflow surface. Each of the claw poles 30 of the present embodiment therefore has segmented planar parts (compressed-powder core faces) on the outer periphery to come in contact with such linear surfaces of the outer peripheral core 50, so that the claw pole 30 has a substantially polygonal shape as a whole. This enables abutting and close contact between the outer peripheral cores 50 and the claw poles 30 without gaps.

Second Embodiment

This embodiment includes a toroidal coil 4 formed by alpha winding (see FIG. 8 to FIG. 11). To form the toroidal coil 4 by alpha winding, a copper wire is wound in a helical manner at the innermost turn of the coil, and two layers of the copper wire are wound in a spiral manner in mutually opposite directions at the other part of the coil. Both ends 42 of the wire 41 are located at the outermost turn of the coil (see FIGS. 10 and 11, for example). The wire 41 includes a flat-type wire, which reduces gaps between adjacent portions of the wire 41 and so increases the winding density of the wire 41.

Such a toroidal coil 4 in the form of alpha winding allows both ends 42 of the wire 41 to be drawn out from the outermost turn of the toroidal coil 4 and so does not need a space kept for the ends. This increases the cross-sectional area of a magnetic path and simplifies the process for winding.

For example, such alpha winding can be made by winding the innermost turn of the wire 41 in a helical manner, winding the other part of the wire 41 in a spiral manner in the mutually opposite directions, and completing winding to form a coil without a core, followed by heating for binding (alpha winding of self-welding flat-type wire).

In one example, the polyphase claw pole motor 1 having three phases like the present embodiment may include three of these toroidal coils 4 in the form of alpha winding that are provided so as to be displaced one by one in the circumferential direction.

The wire 41 in the present embodiment is a flat-type wire with cross-sectional sides having different lengths, and such wire 41 is wound in a flatwise manner so that its longitudinal direction is along the axial direction of the motor. Typically wire ends from a coil have to be drawn out to the outside through a gap between outer peripheral cores (outer peripheral yokes). Since the magnetic path of the outer peripheral cores is required to have a largest possible cross-sectional area to reduce the magnetic resistance, the gap between the outer peripheral cores is preferably small. To this end, the present embodiment includes the toroidal coils 4 in the form of alpha and flatwise winding with the cross-sectional longitudinal direction oriented in the axial direction, and aligns the wire ends (of the wire 41) from the coil in the axial direction (see FIGS. 10 and 11, for example). This allows the wires having a narrow cross section in the tangential direction to pass through the gaps between the outer peripheral cores (in other words, through a circumferentially narrow cutout 34*a* in an outer peripheral part 34 of the claw pole 30), and so keeps enough cross-sectional area of the wire. The present embodiment therefore provides a coil with a low copper loss as a whole.

Third Embodiment

A polyphase claw pole motor 1 of this embodiment includes claw poles 30 that are magnetic-molded products formed by compressing magnetic powder. Each of the claw poles 30 includes a plurality of claws 31, each having a pole surface 31*a* that extends in the axial direction and faces the rotator with a minute gap, an annular part 32 extending radially outward from the claws 31, and an outer peripheral part 34 extending in the axial direction (see FIGS. 12 and 13). These pluralities of claw poles 30 are stacked in the axial direction so as to form a stator 2 so that claws 31 of the mutually adjacent claw poles 30 are arranged alternately in the circumferential direction, and annular parts 32 of the mutually adjacent claw poles 30 face each other in the axial direction.

The outer peripheral part 34 of each claw pole 30 has cutouts 34*a* to take out the wires 41 of the toroidal coils 4 to the outside. The adjacent claw poles 30 as a pair may be arranged while opposing their annular parts 32 in the axial direction so that their cutouts 34*a* face each other to define a drawing hole in size corresponding to the size of the wire 41 to be drawn out (see FIGS. 12 and 13).

Similarly to the above embodiment, each of the toroidal coils 4 is in the form of alpha winding, and is arranged in the gap between the annular parts 32 of the adjacent claw poles 30. The wire 41 is a flat-type wire, and is drawn out to the outside from the drawing hole defined with a pair of opposed cutouts 34*a* (see FIGS. 12 and 13).

Figure 12:
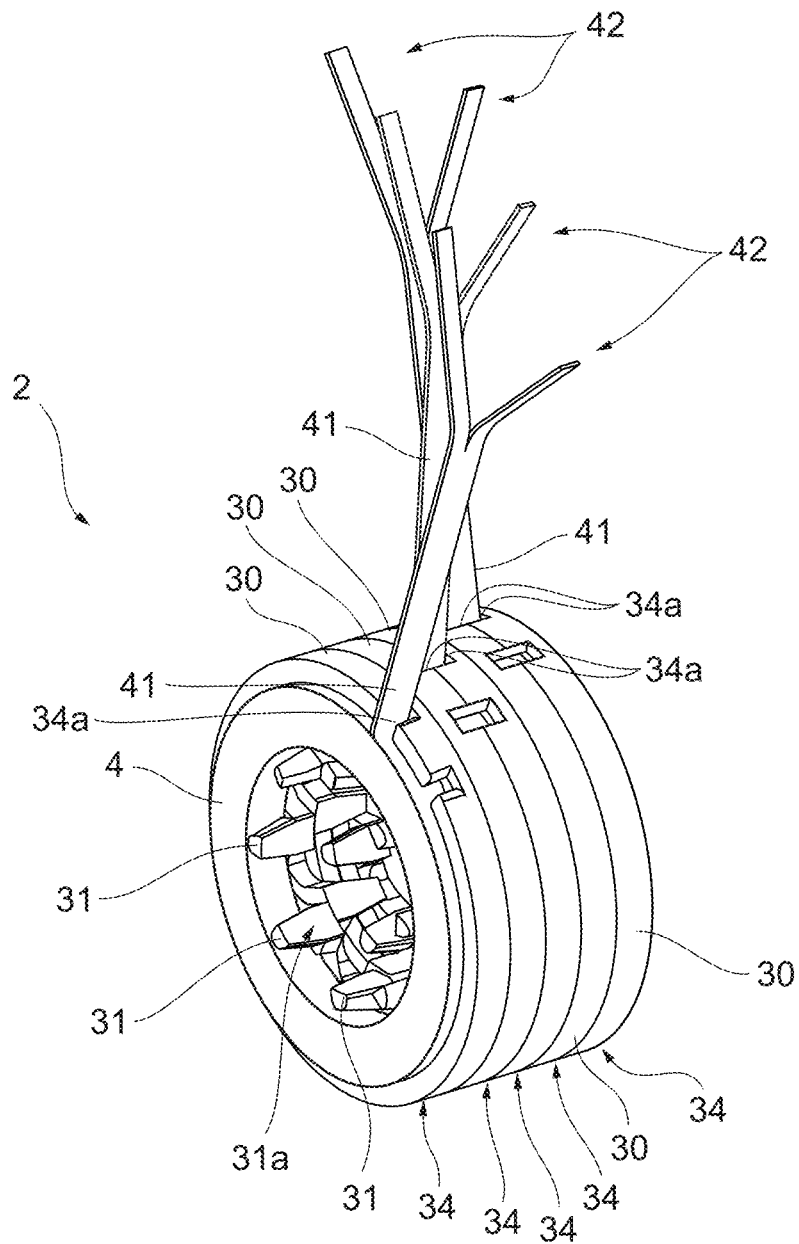
FIG. 12 is a perspective view showing a state in which three toroidal coils formed by alpha winding are displaced one by one in the circumferential direction while omitting one of the outer peripheral cores to make the inside visible.
Figure 13:
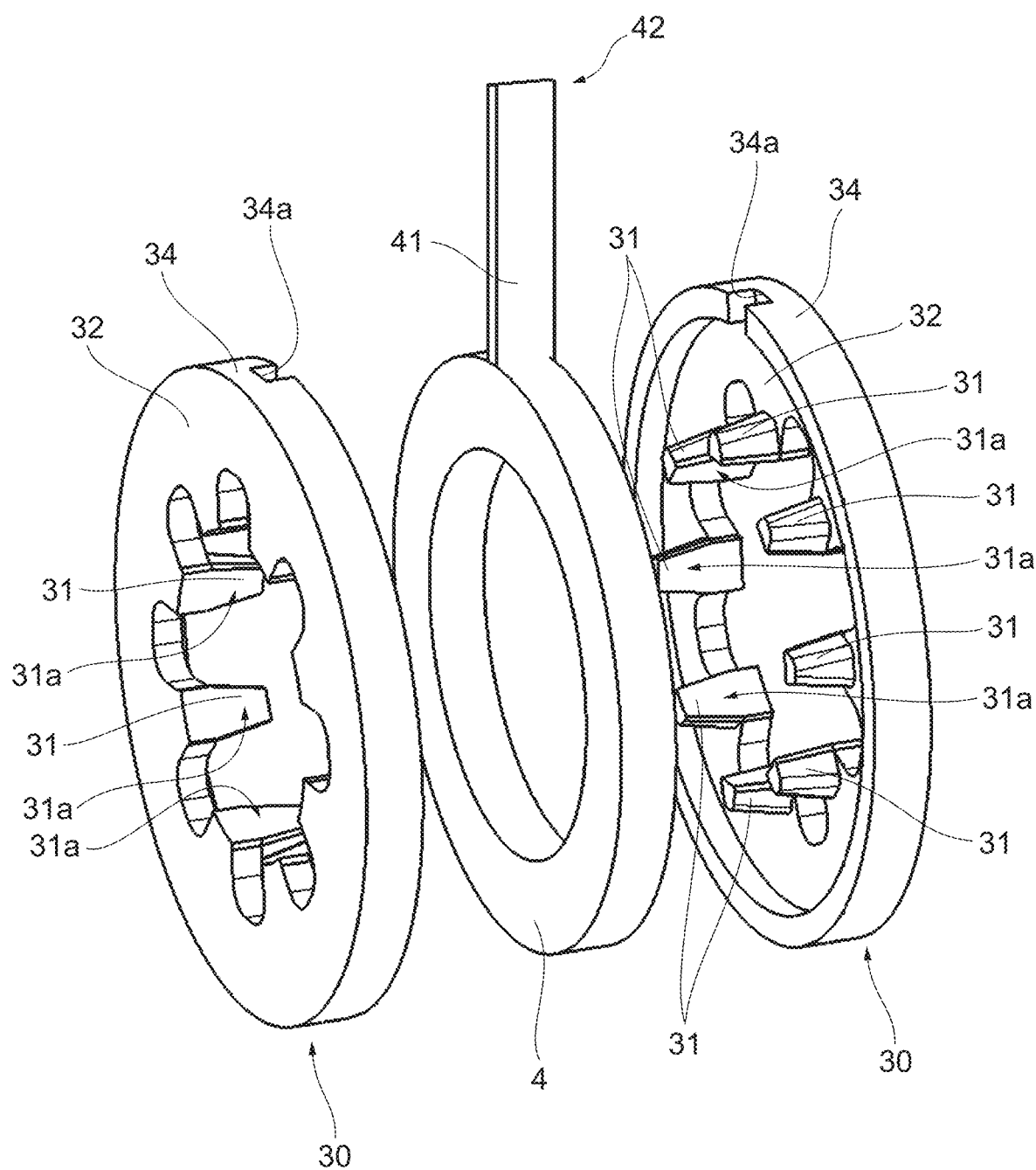
FIG. 13 is an exploded perspective view showing a pair of claw poles and a toroidal coil.

In one example, the polyphase claw pole motor 1 having three phases like the present embodiment may include three of these toroidal coils 4 in the form of alpha winding that are provided so as to be displaced one by one in the circumferential direction (see FIG. 12).

The polyphase claw pole motor 1 of the present embodiment includes the stator 2 that is a magnetic-molded product as a whole formed by compressing magnetic powder. Such a polyphase claw pole motor includes the toroidal coil 4 in the form of alpha winding similar to the above embodiment so that both ends 42 of the wire 41 are drawn out from the outermost turn of the toroidal coil 4. This simplifies the process for winding of the coil.

Fourth Embodiment

In a polyphase claw pole motor 1 of this embodiment, a surface of the projection 50a of each outer peripheral yoke 50, which is to be in contact with the outer periphery of the claw pole 30, includes an engaging part 55, and an outer peripheral surface of each claw pole 30, which is to be in contact with the outer peripheral core 50, includes an engaged part 35 that engages with the engaging part 55 of the outer peripheral core 50. The engaged part 35 extends along the extending direction of the claw 31 so as to be configured in an inner circumferentially engaging form. Such a configuration has the following effects.

More specifically, a pair of claw poles (compressed-powder cores) 30 that are joined so as to face each other as described in the above first to third embodiments receive a magnetic attractive force acting on each other. Although such a magnetic attractive force is cancelled out in the radial and circumferential directions, the magnetic attractive forces acts in the axial direction without cancellation. The polyphase claw pole motor 1 of the present embodiment includes the toroidal coil 4 between the claw poles 30 (see FIG. 14, for example), and it is not preferable for such toroidal coil 4 to support the attractive force in terms of insulation. The engaged parts 35 on the outer peripheral surface of each claw pole 30 are formed as stated above so as to engage with the engaging parts 55 of the outer peripheral yoke 50. This controls the gap between the pair of claw poles 30 facing each other so as not to bring the claw poles 30 closer to each other within a predetermined distance, and allows the outer peripheral cores 50 to support the attractive force without the attractive force acting on the toroidal coil 4. In other words, the outer peripheral cores 50 function as a stopper (supporter) that controls the minimum gap between the claw poles 30 to a distance slightly larger than the thickness of the toroidal coil 4. This limits the force acting on the toroidal coil 4.

Figure 14:
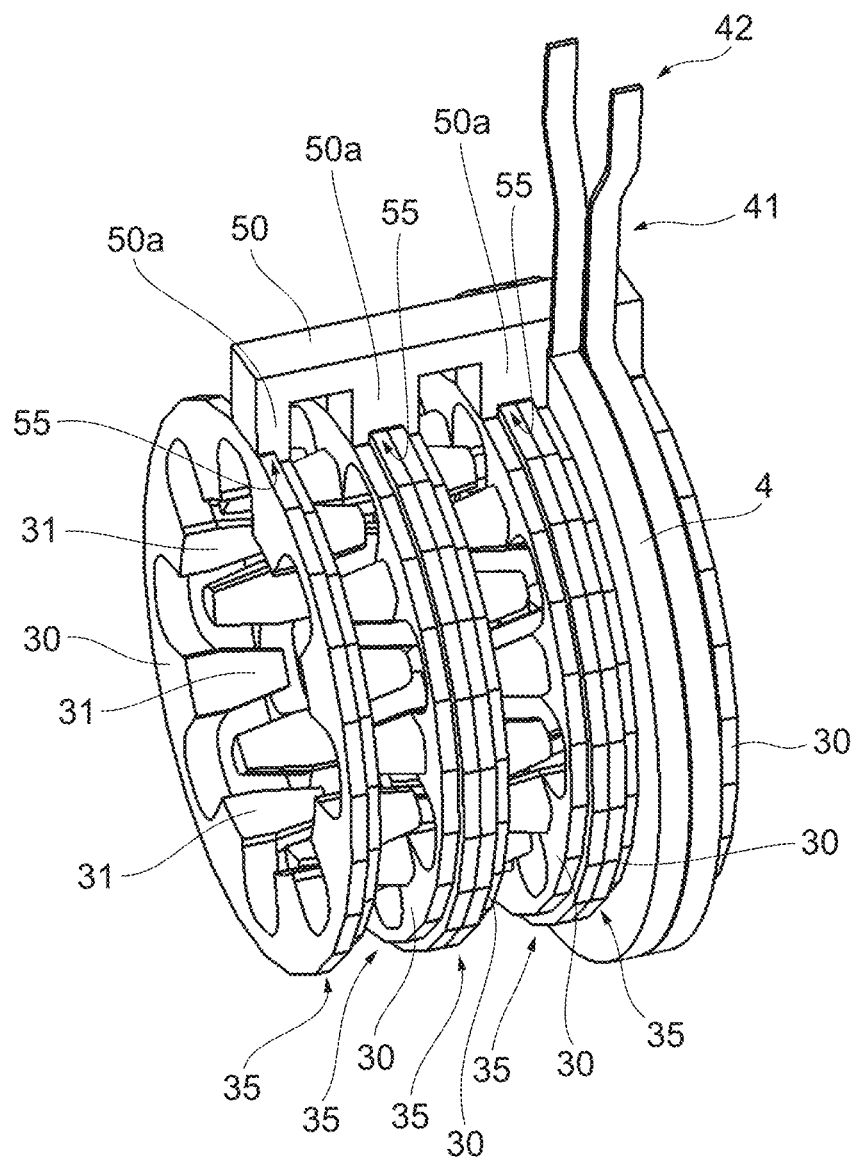
FIG. 14 is a perspective view showing an inner peripheral stator part and an outer peripheral core while omitting an interposed member.
Figure 15:
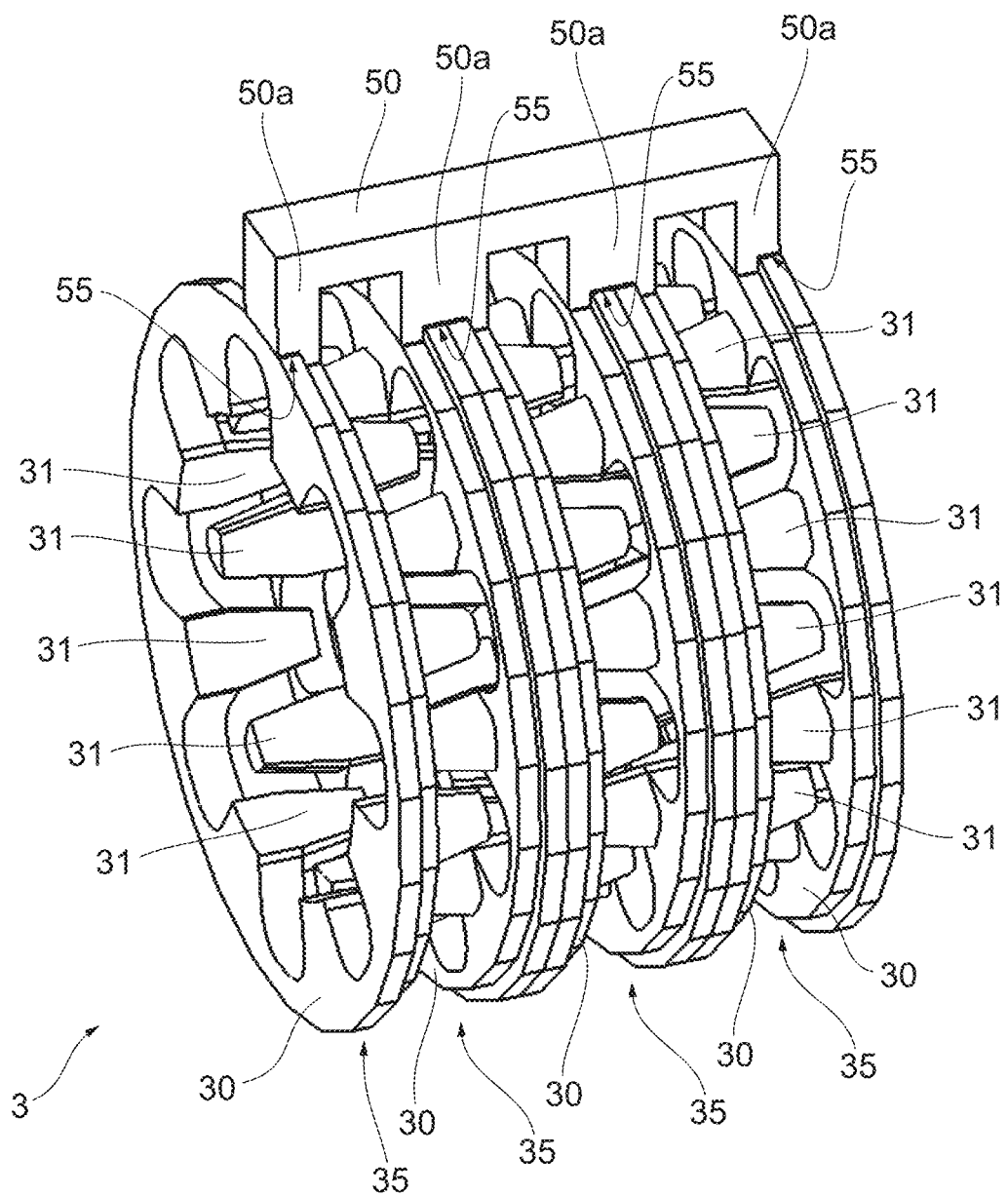
FIG. 15 is a perspective view showing the inner peripheral stator part and the outer peripheral core while omitting the interposed member.

The specific structure of these engaged parts 35 and engaging parts 55 is not limited especially as long as the engagement between them keeps a predetermined distance between the claw poles 30. In one example, the engaged parts 35 may each have a tapered shape with an inclined surface that is inclined along the extending direction of the claws 31 so as to be configured in an inner circumferentially engaging form. The engaged parts 35 may each have a stepped shape as shown in FIGS. 14 and 15.

Figure 16:
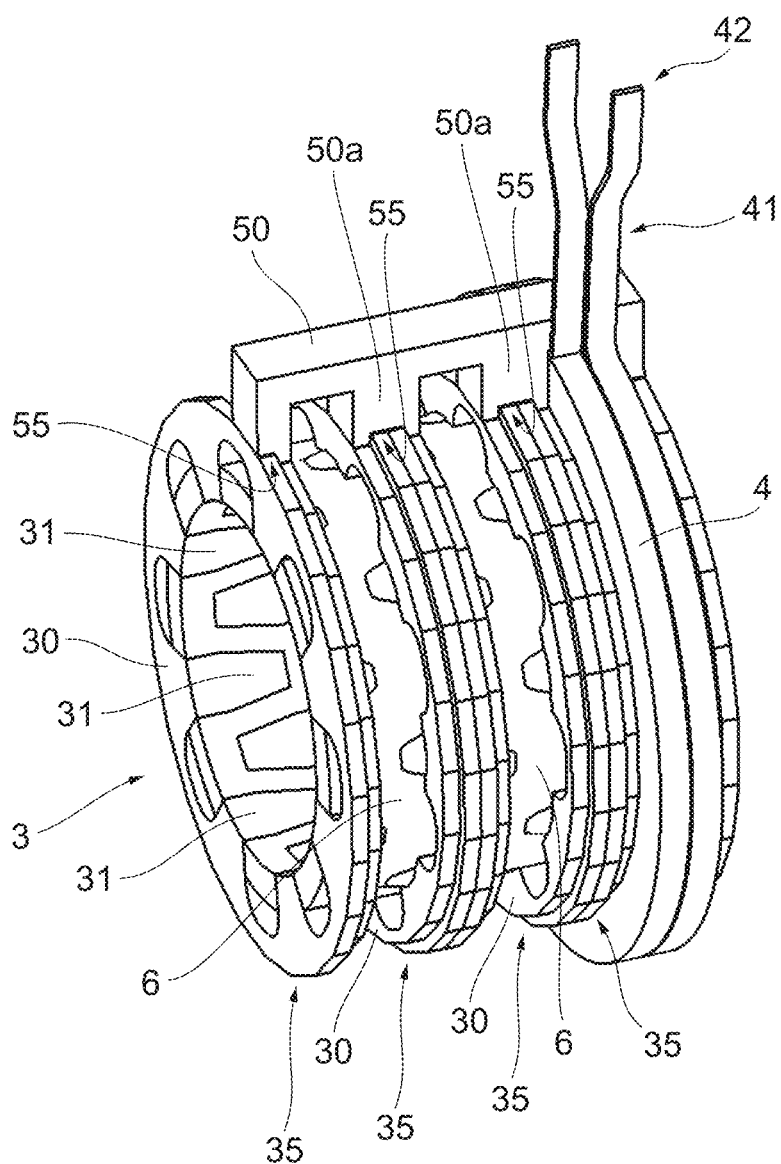
FIG. 16 is a perspective view showing an example of an inner peripheral stator part, an outer peripheral core and a toroidal coil, wherein engaging parts are formed on the outer peripheral cores, and engaged parts that engage with the engaging parts are formed on the outer periphery of claw poles.
Figure 17:
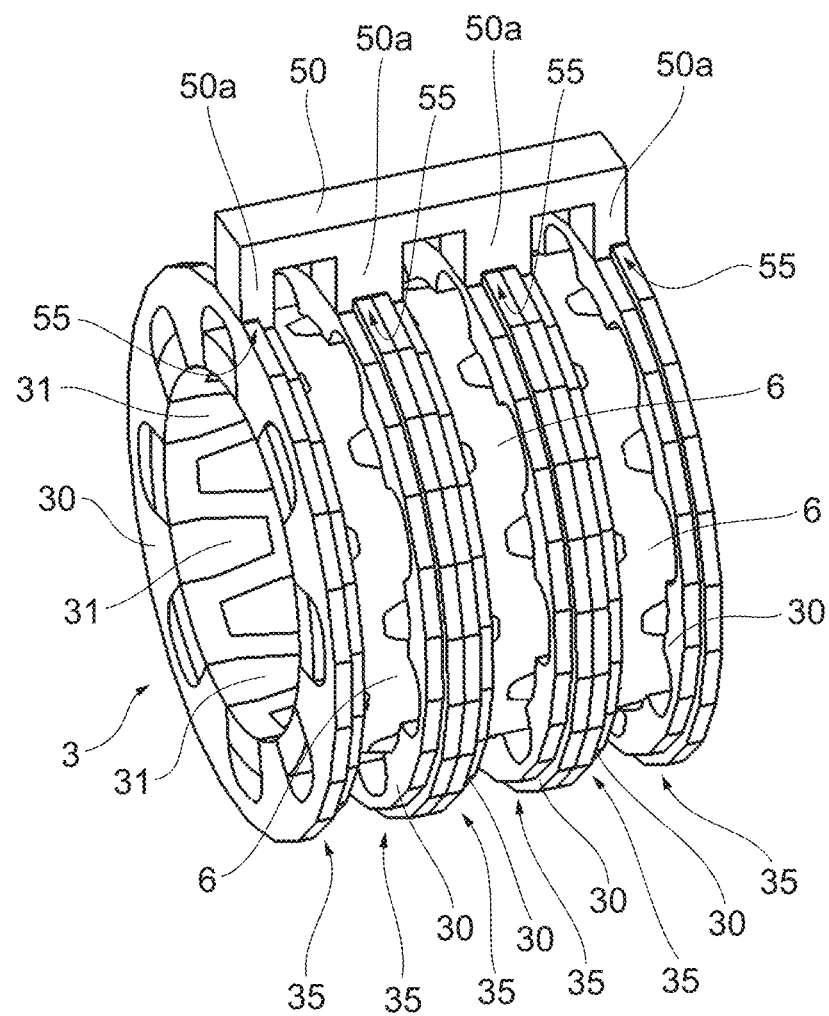
FIG. 17 is a perspective view showing the inner peripheral stator part and the outer peripheral core while omitting the toroidal coil in FIG. 16.

A tubular interposed member 6 may be interposed between the pair of claw poles 30 that are joined so as to face each other, and this interposed member 6 may be used to receive the magnetic attractive force. In this case, the above-described engaged parts 35 and engaging parts 55 may be additionally disposed so that the magnetic attractive force applied to the insert 6 reduces by sharing it with the plurality of outer peripheral cores 50 (see FIGS. 16 and 17, for example). The insert 6 may function as the positioning member to place these claw poles 30 at their predetermined relative positions.

Fifth Embodiment

A polyphase claw pole motor 1 of this embodiment includes a part or all of the annular parts 32 and the plurality of claws 31 that are magnetic-molded product (compressed-powder cores) formed by compressing magnetic powder while electrically insulating the surface of such powder in order to increase a cross-sectional area of a magnetic path in the polyphase claw pole motor 1. This polyphase claw pole motor 1 includes a wound core 57 as at least a part of the magnetic-path defining member in the axial direction. The wound core 57 is formed by winding a soft magnetic plate into a substantially cylindrical shape around the rotary shaft (see FIG. 18B).

Figure 19:
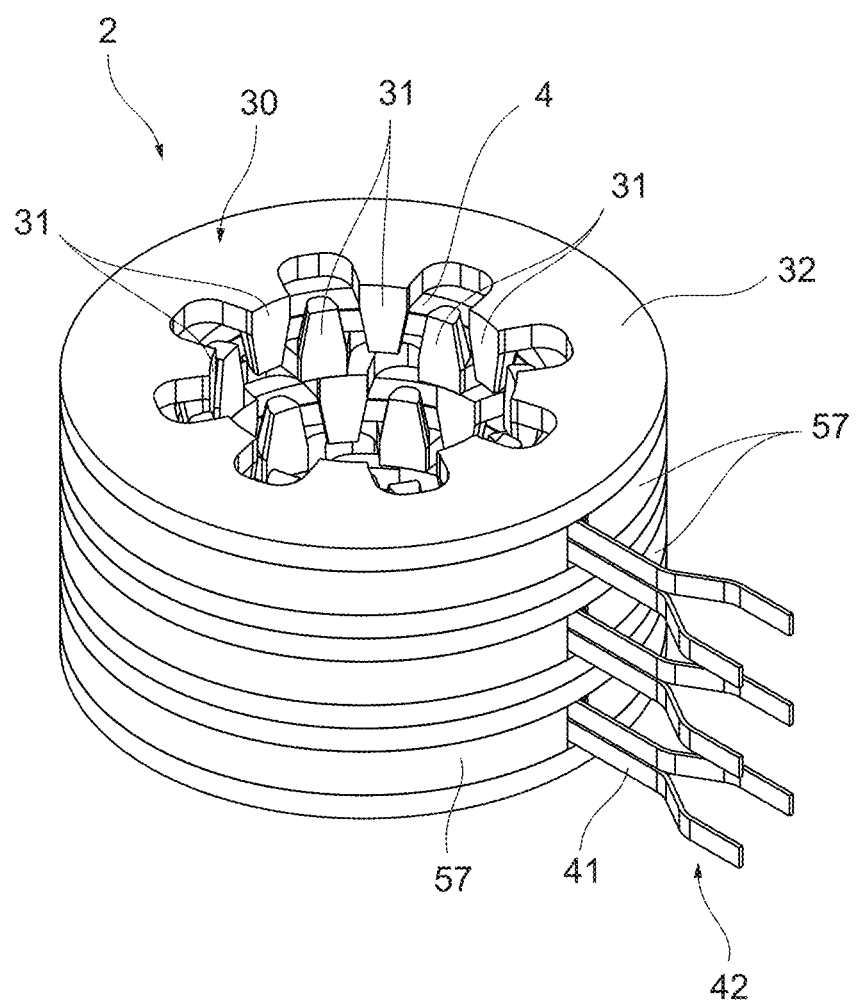
FIG. 19 is a perspective view showing one example of a stator having a gap to take out wire ends of the wire of the toroidal coil.
Figure 20:
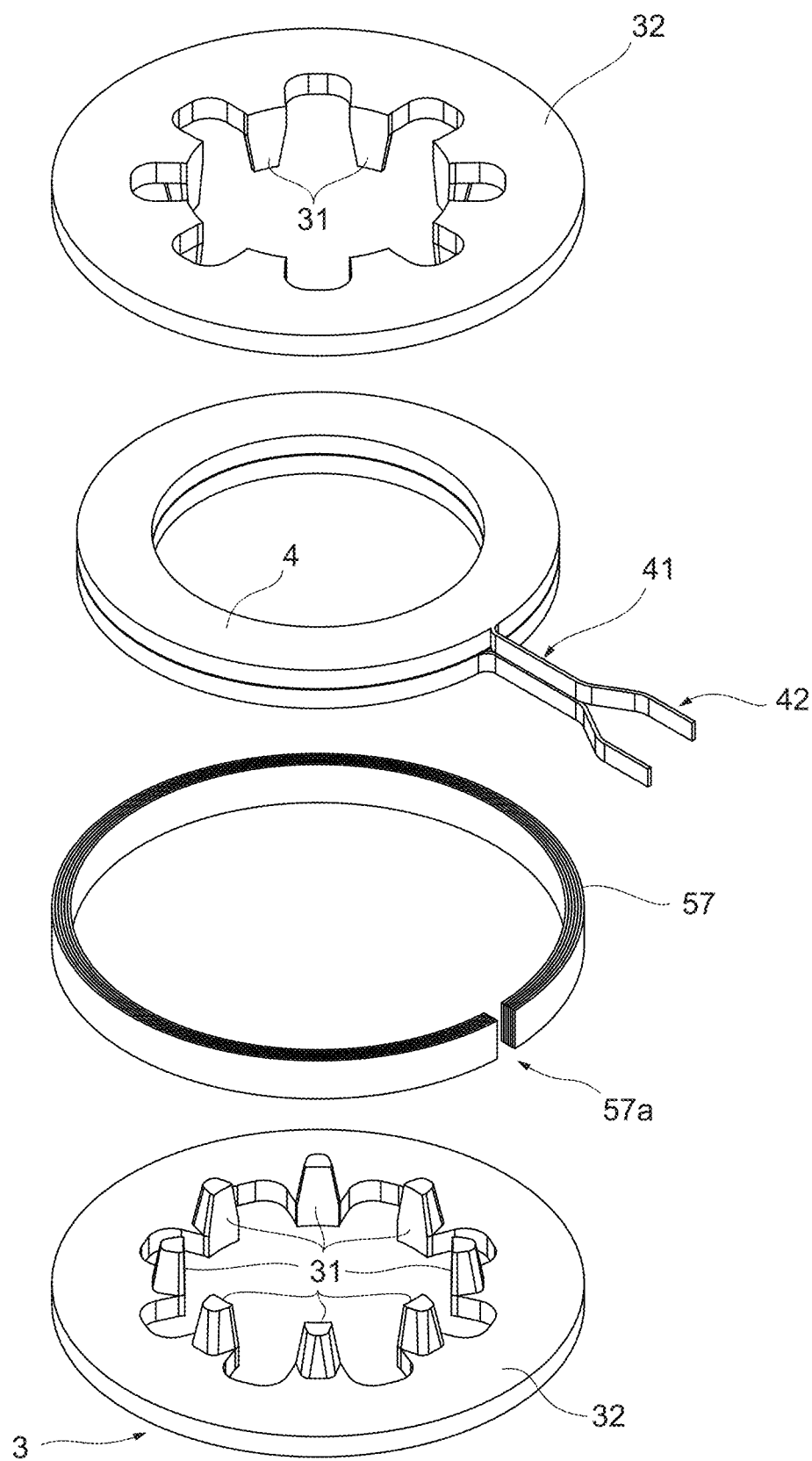
FIG. 20 is an exploded perspective view of claw poles for single phase of a polyphase claw pole motor.

The wound core 57 is formed by winding a soft magnetic material, e.g., an directional magnetic steel sheet having high material yield and having excellent magnetic characteristics, into a spiral form, or by arranging such a material in a spiral form (see FIG. 20, for example) to form a part of the magnetic-path defining part in the axial direction. This wound core 57 is wound so that the rolling direction is directed toward the center axis of the winding. The wound core 57 has a gap 57a that is a blank at a part of the circumference (see FIG. 20). Through this gap 57a, wire ends, including the wire ends 42 of the wire 41 of the toroidal coil 4, are drawn out (see FIG. 19 and FIG. 20).

Figure 18A:
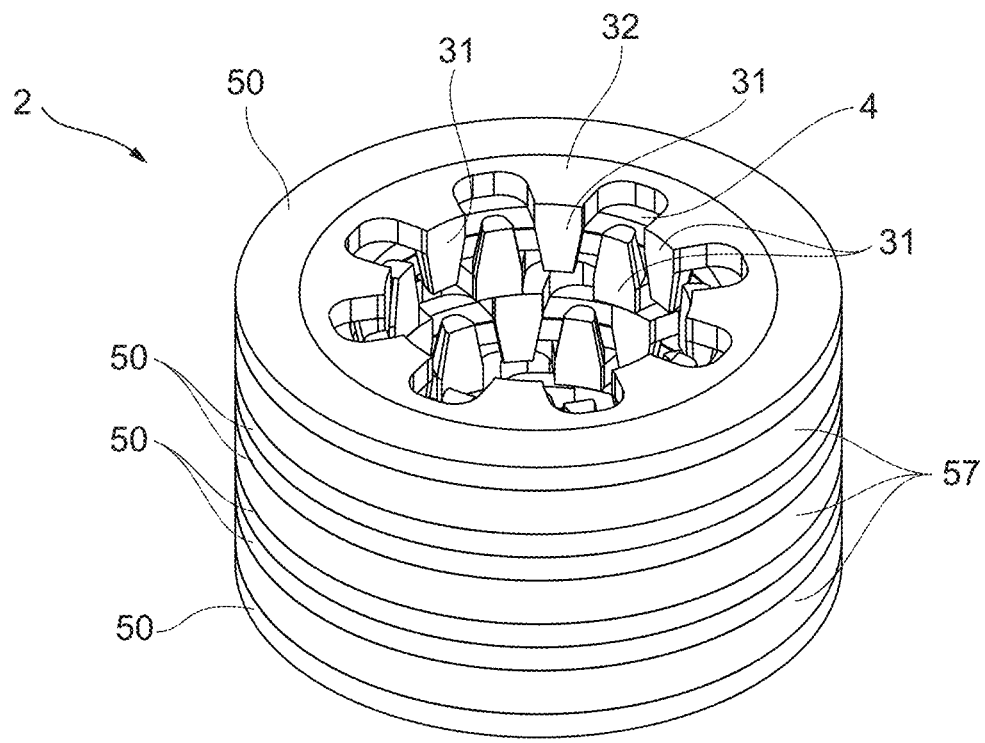
FIG. 18A is a perspective view of one example of an inner peripheral stator part of a polyphase claw pole motor according to a fifth embodiment and FIG. 18B is a perspective view of another example.
Figure 18B:
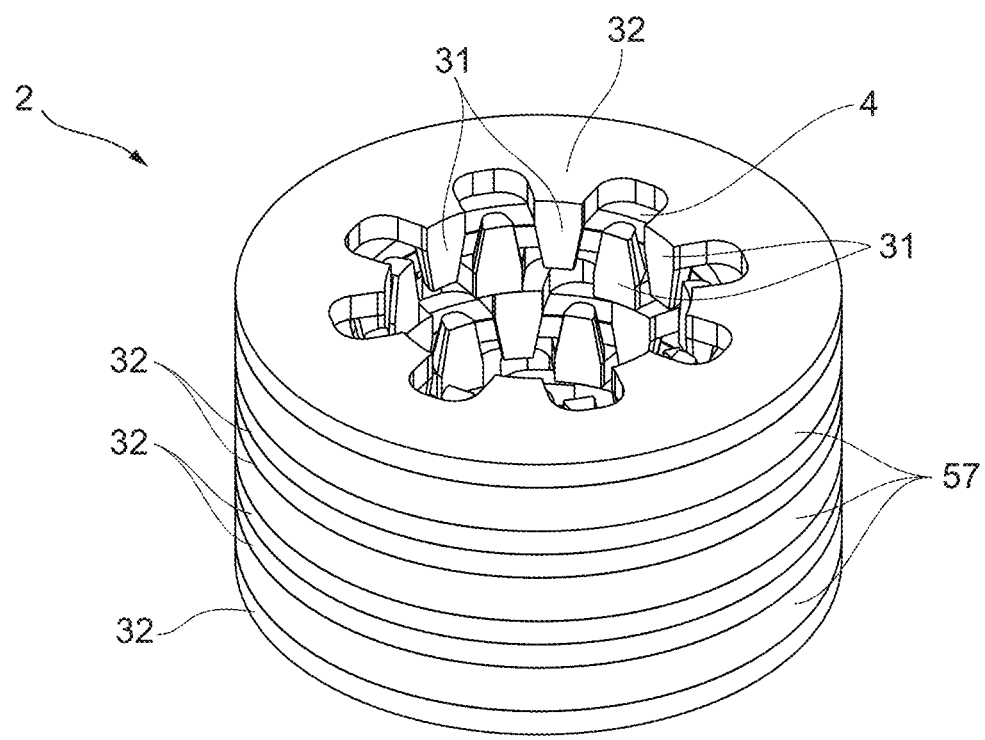

The polyphase claw pole motor 1 may include, as the laminate core (outer peripheral cores 50), flat-plate members in contact with the wound cores 57 in the axial direction (see FIG. 18A). In this case, a part of the radial magnetic-path defining part (outer peripheral part) may be formed by stamping a magnetic steel sheet 51 and stacking these stamped sheets in the axial direction to be an annular laminate core (outer peripheral core 50). Alternatively, a part of the radial magnetic-path defining part (outer peripheral part) may be formed by integrating a plurality of circumferentially segmented magnetic steel sheets 51 (or blocks of the laminate core) to be in the annular form (see FIG. 21).

The present embodiment includes the radial magnetic-path defining member including a compressed-powder member and a radially outer peripheral part of the magnetic-path defining member that are formed of a magnetic steel sheet 51 at low cost and having high magnetic characteristics. The resultant polyphase claw pole motor 1 therefore has a lot of interlinkage magnetic fluxes and low core loss and is at a low cost. Parts at least including the claws 31 of the claw pole 30 are compressed-powder cores. This enables a motor having a higher output, a compact size, a lower loss (iron loss) due to an increase of the interlinkage magnetic flux.

Sixth Embodiment

Figure 23A:
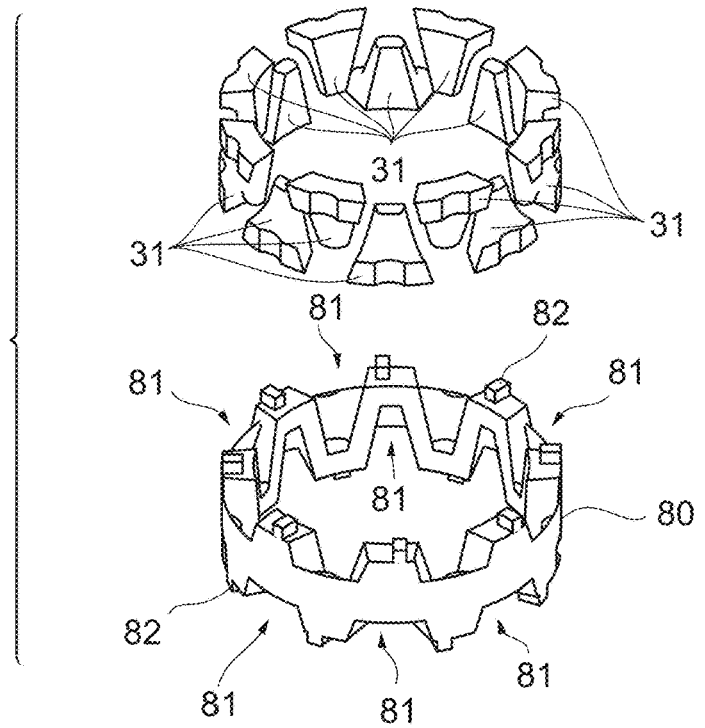
FIG. 23A is a perspective view showing claws made of a compressed-powder material and a resin holder that are separated.
Figure 23B:
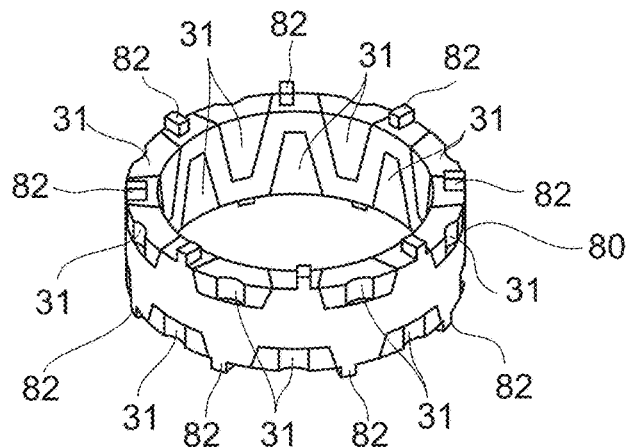
FIG. 23B is a perspective view of the claws fitted into the notches 81 of the resin holder.
Figure 23C:
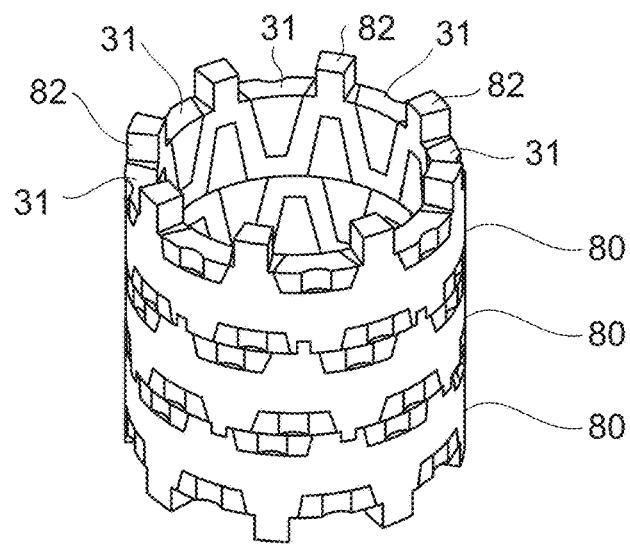
FIG. 23C is a perspective view of the resin holders for three phases each holding the claws that are overlaid.

A polyphase claw pole motor 1 of this embodiment has the stator 2 that includes claws 31 that are claw-shaped parts facing the gap to dispose the rotor core and are magnetic-molded products (compressed-powder member) formed by compressing magnetic powder, and the other parts made of dense soft-magnetic materials (see FIG. 23).

Figure 22:
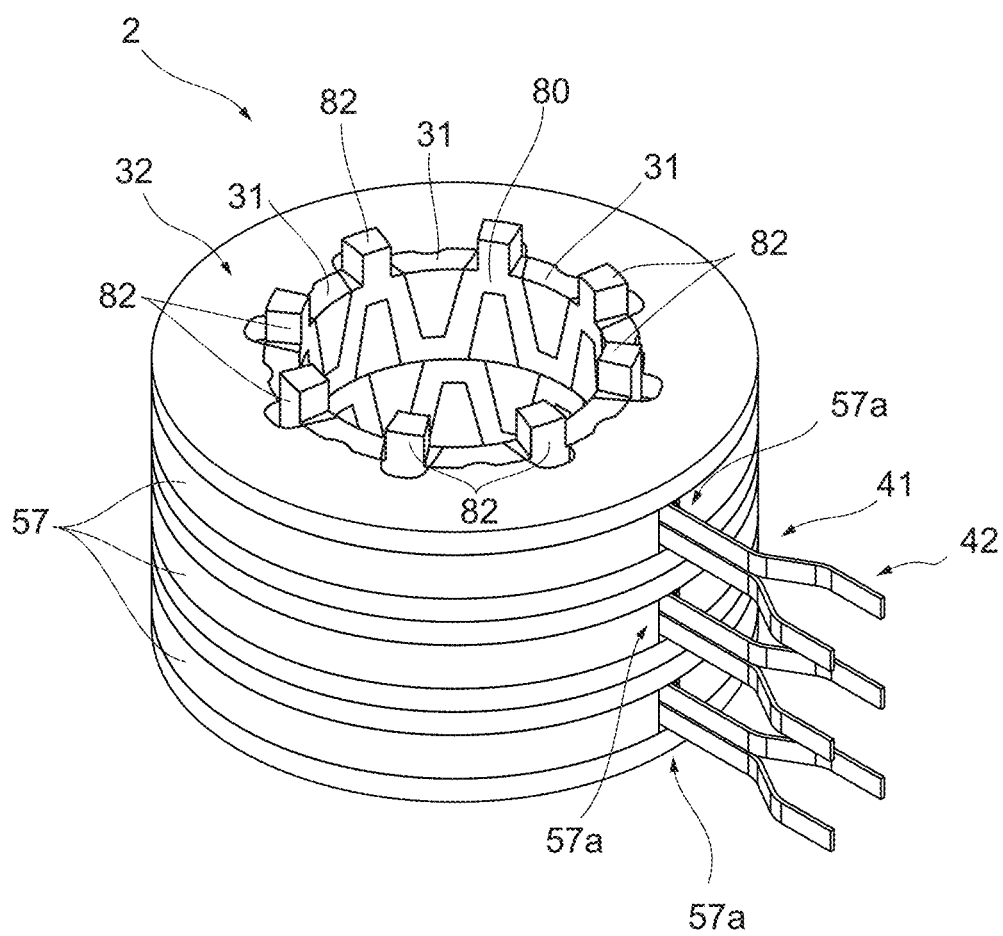
FIG. 22 is a perspective view of a stator in a sixth embodiment.

The parts other than the claws 31, i.e., parts other than the claws 31 of the magnetic-path defining member of the claw pole 30 are made of a material having high material yield and excellent magnetic characteristics, e.g., a magnetic steel sheet (see the annular part 32 and the wound core 57 in FIG. 22).

The claws 31 made of a compressed-powder member (compressed-powder core) are separated for each pole, and these claws 31 are held at a resin holder 80 (see FIG. 23).

The resin holder 80 is separately molded from the claws 31, and holds the claws 31 fitted in two axial directions of the polyphase claw pole motor 1 to keep a predetermined circumferential angle of these claws 31 and a predetermined distance between the facing claws 31. The resin holder 80 of the present embodiment has an annular shape, and has notches 81 to dispose the claws 31 in an annular form and at regular angular intervals. Each claw 31 is fixed or bonded to the corresponding notch 81 for holding.

The resin holder 80 of the present embodiment includes notches 81 that are open in one axial direction of the polyphase claw pole motor 1 (e.g., upward in FIG. 23) and notches 81 that are open in the other direction (e.g., downward in FIG. 23), and these notches 81 in different directions are alternately arranged in the circumferential direction (see FIG. 23). The resin holder 80 of the present embodiment is a resin mold integrally formed with the claws 31 corresponding to an annular one layer, an opposed one electric phase, or all phases.

The resin holder 80 includes positioning parts 82 to determine the circumferential position of the claw pole 30 for each phase, and determine the concentricity and the relative angle of the claw poles 30. For instance, the resin holder 80 of the present embodiment includes positioning part 82 made up of a relatively small protrusions and recesses at positions where the adjacent resin holders 80 for different phases are engaged (see FIGS. 23A and 23B), and positioning parts 82 made up of a relatively large protrusions at positions to engage with the other parts (e.g., with the front bracket 16, the rear bracket 17, and the resin mold 19) (see FIG. 23C).

This polyphase claw pole motor 1 is formed of a wound core 57 as a part of the magnetic-path defining member in the axial direction. The wound core 57 is formed by winding a soft magnetic plate into a substantially cylindrical shape around the rotary shaft (see FIG. 22). Similarly to the above embodiment, the wound core 57 is formed by winding a soft magnetic material, e.g., a directional magnetic steel sheet having high material yield and having excellent magnetic characteristics, into a spiral form, or by arranging such a material in a spiral form to form a part of the magnetic-path defining part in the axial direction. This wound core 57 is wound so that the rolling direction is directed toward the center axis of the winding. The wound core 57 has a gap 57*a* that is a blank at a part of the circumference. Through this gap 57*a*, wire ends, including the wire ends 42 of the wire 41 of the toroidal coil 4, are drawn out.

The present embodiment includes a lot of parts other than the claws 31 of the magnetic-path defining member in the radial direction that are made of a material at low cost and having high magnetic characteristics. The resultant polyphase claw pole motor 1 therefore has a lot of interlinkage magnetic fluxes and low core loss and is at a low cost. Since the claws 31 of the claw pole 30 are compressed-powder cores, the polyphase claw pole motor has a higher output, a compact size, a lower loss (iron loss) due to an increase of the interlinkage magnetic flux.

Seventh Embodiment

The above sixth embodiment forms the resin holder 80 as a single member, and fits the claws into the notches 81 of the resin holder 80 for holding. Instead, this embodiment forms a resin holder 80 by molding that is a hybrid component integral with claws 31 (see FIG. 24). Such a single component including the claws 31 for one phase and the resin holder 80 facilitates the assembly processing of the polyphase claw pole motor 1 (see FIG. 25 to FIG. 31).

The resin holder 80 is integrally formed with a plurality of claws 31 in one layer that are arranged annularly. The claw poles 31 are fixed or bonded to the resin holder 80.

Figure 24:
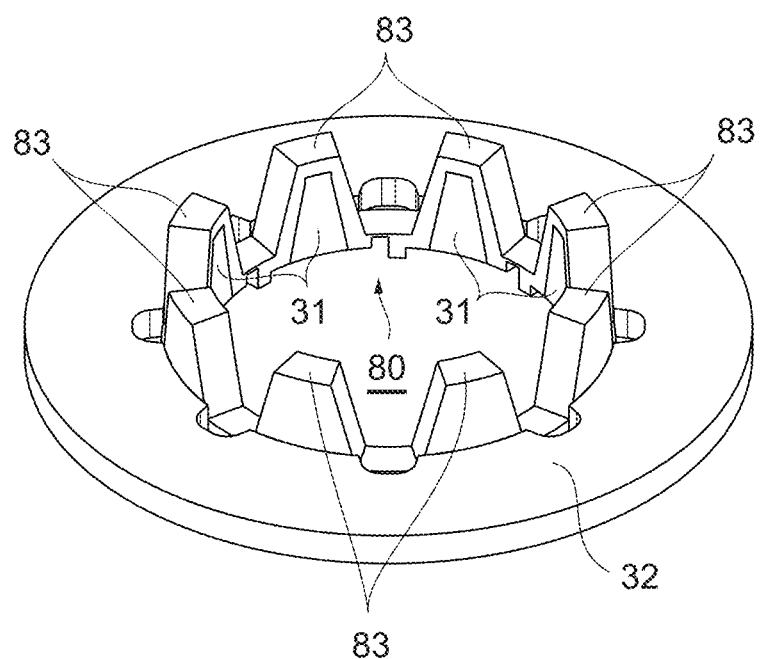
FIG. 24 is a perspective view of a resin holder integrally formed with claws during molding in a seventh embodiment.
Figure 25:
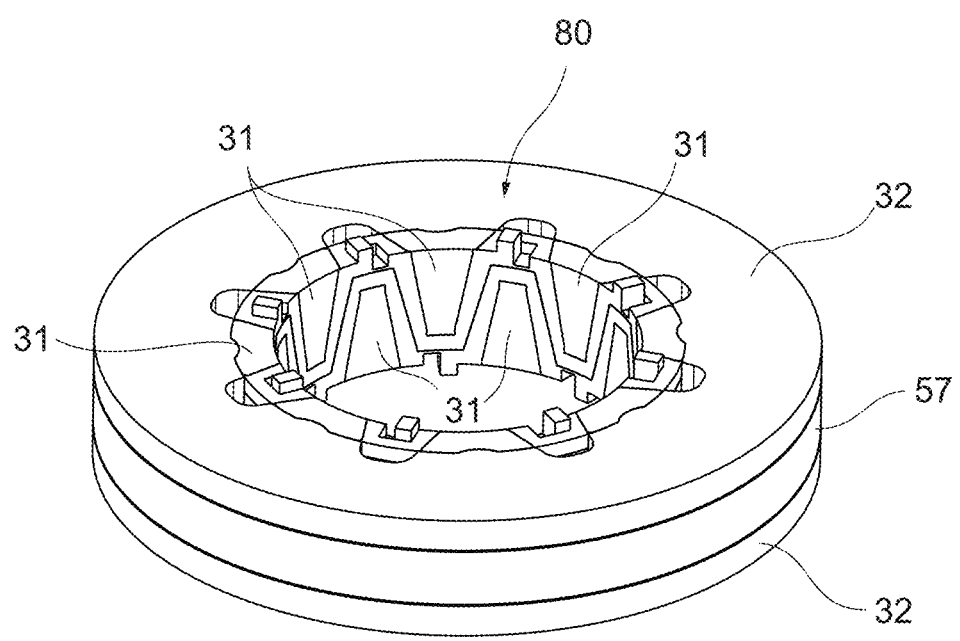
FIG. 25 is a perspective view of a pair of resin holders that are combined, each resin holder being integrally formed with claws.
Figure 26:
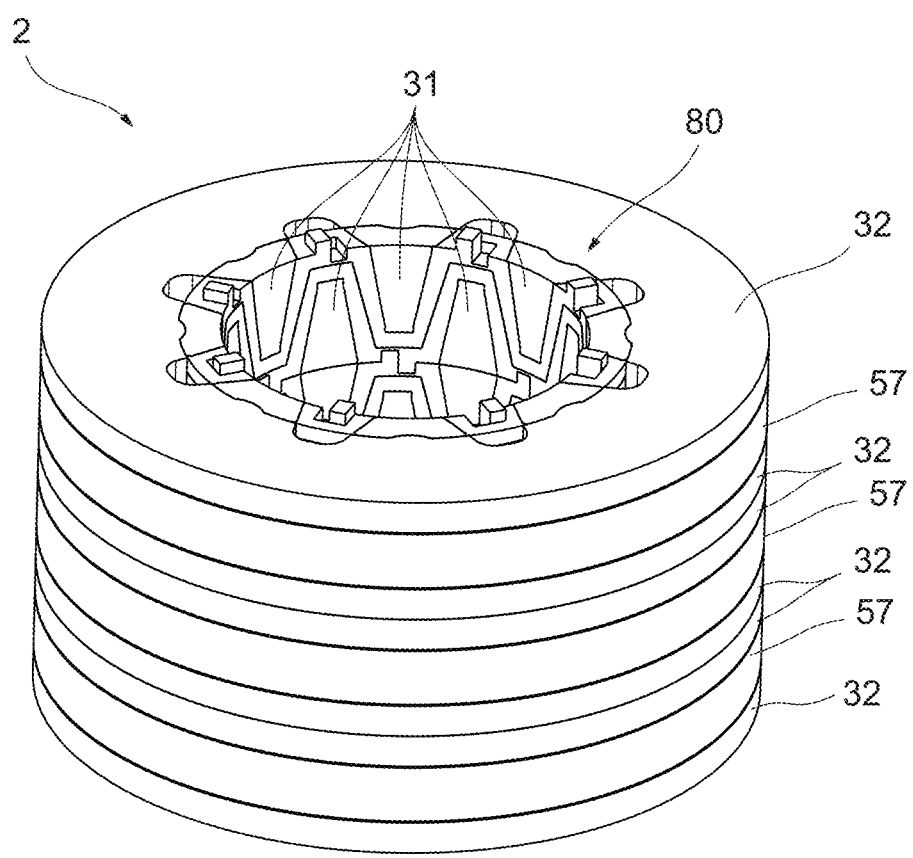
FIG. 26 is a perspective view of the resin holders shown in FIG. 25 that are overlaid for three phases.
Figure 27:
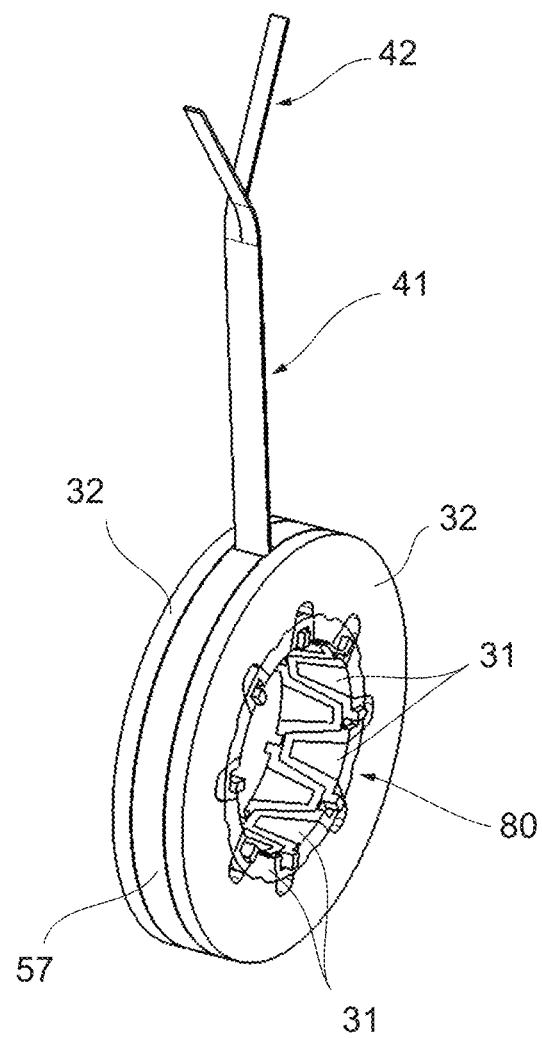
FIG. 27 is a perspective view of a pair of resin holders that are combined, each resin holder being integrally formed with claws, and wire ends of the toroidal coil that are drawn out from the wound core.
Figure 28:
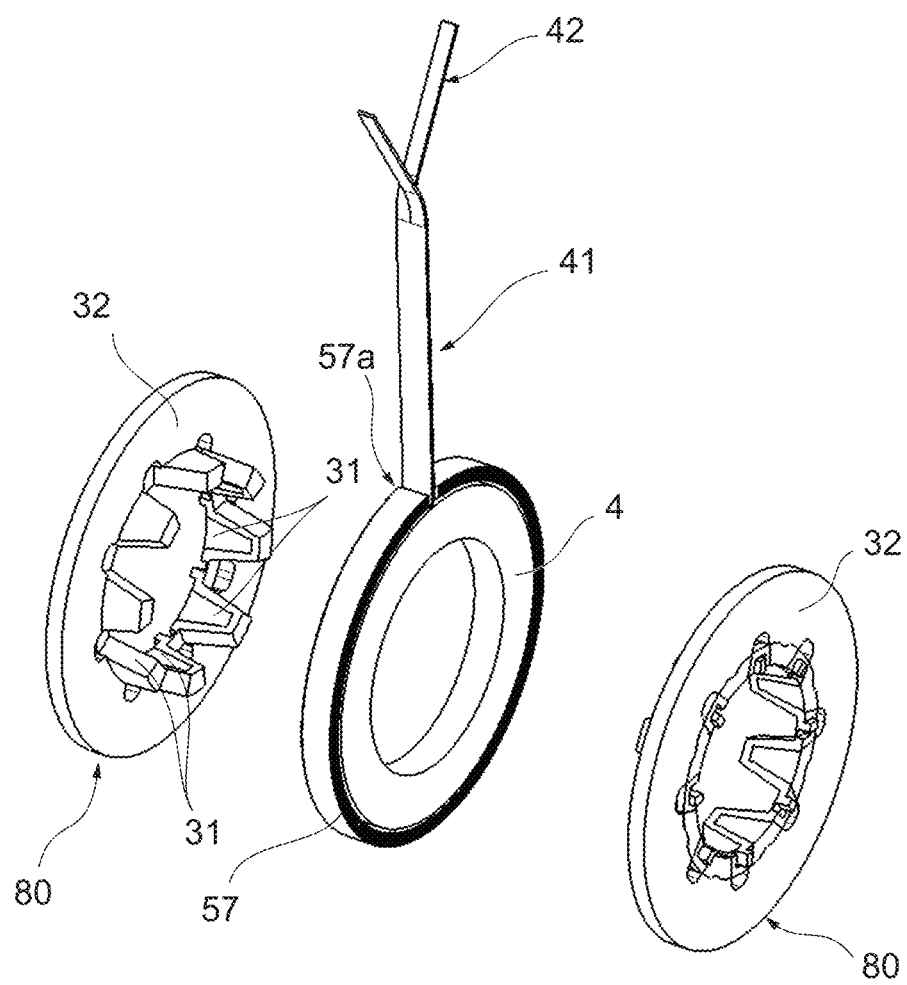
FIG. 28 is an exploded perspective view of FIG. 27.
Figure 29:
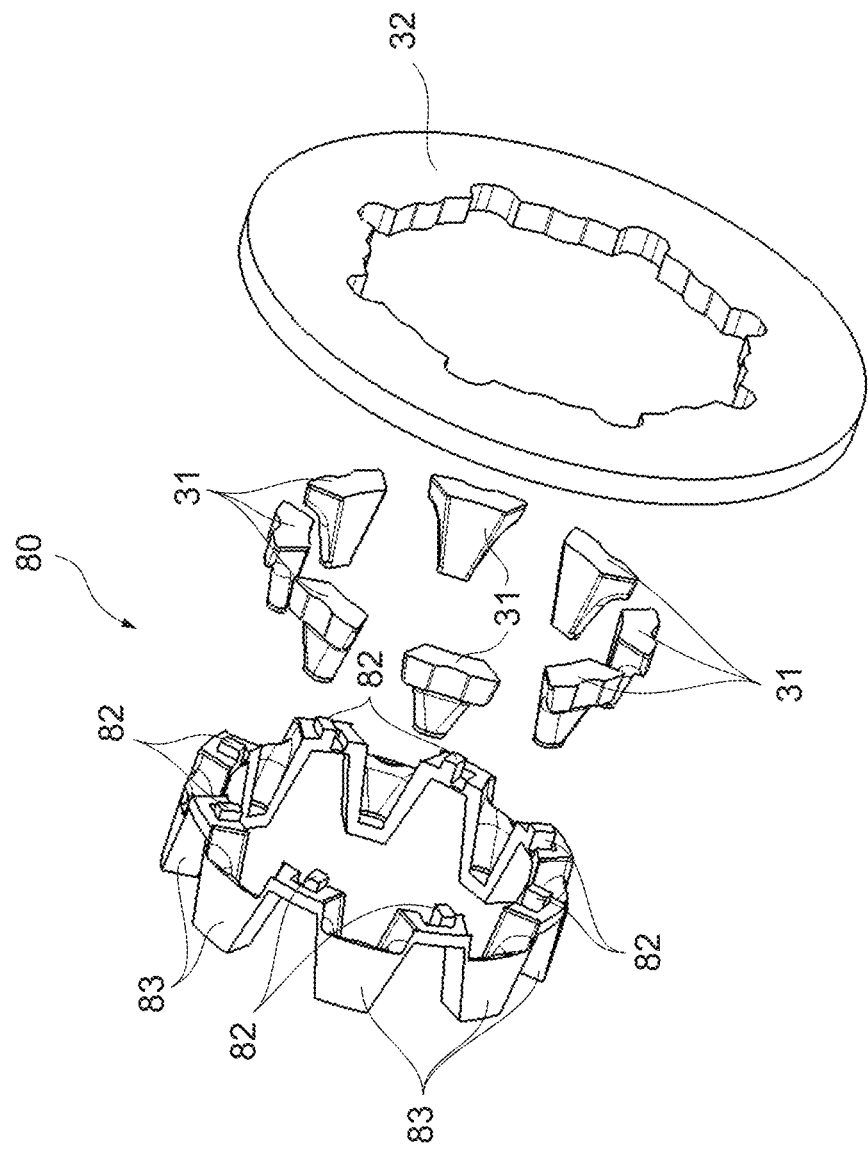
FIG. 29 is an exploded perspective view of a resin holder, claws and an annular part.

In one example, the resin holder 80 is combined and integrated with an annular part 32 that is a magnetic steel sheet (see FIG. 24 and FIG. 29, for example). The annular part 32 is an annular portion extending radially outward from the claws 31 (on the outer periphery) of the claw pole 30.

A resin holder 80 and a counter resin holder 80 as a pair may be configured to fit to each other. In one example, the resin holder 80 of the present embodiment includes protrusions 83 protruding toward the counter resin holder 80. These protrusions 83 have a tapered shape having the circumferential width getting narrower toward the end, and the plurality of protrusions 83 are disposed at regular intervals (see FIG. 28, for example). Combination of the resin holders 80 as a pair allows each of the protrusions 83 to fit into the position between two protrusions 83 of the counter resin holder 80, so that these resin holders 80 as a pair fit to each other (see FIG. 31, for example).

Figure 30:
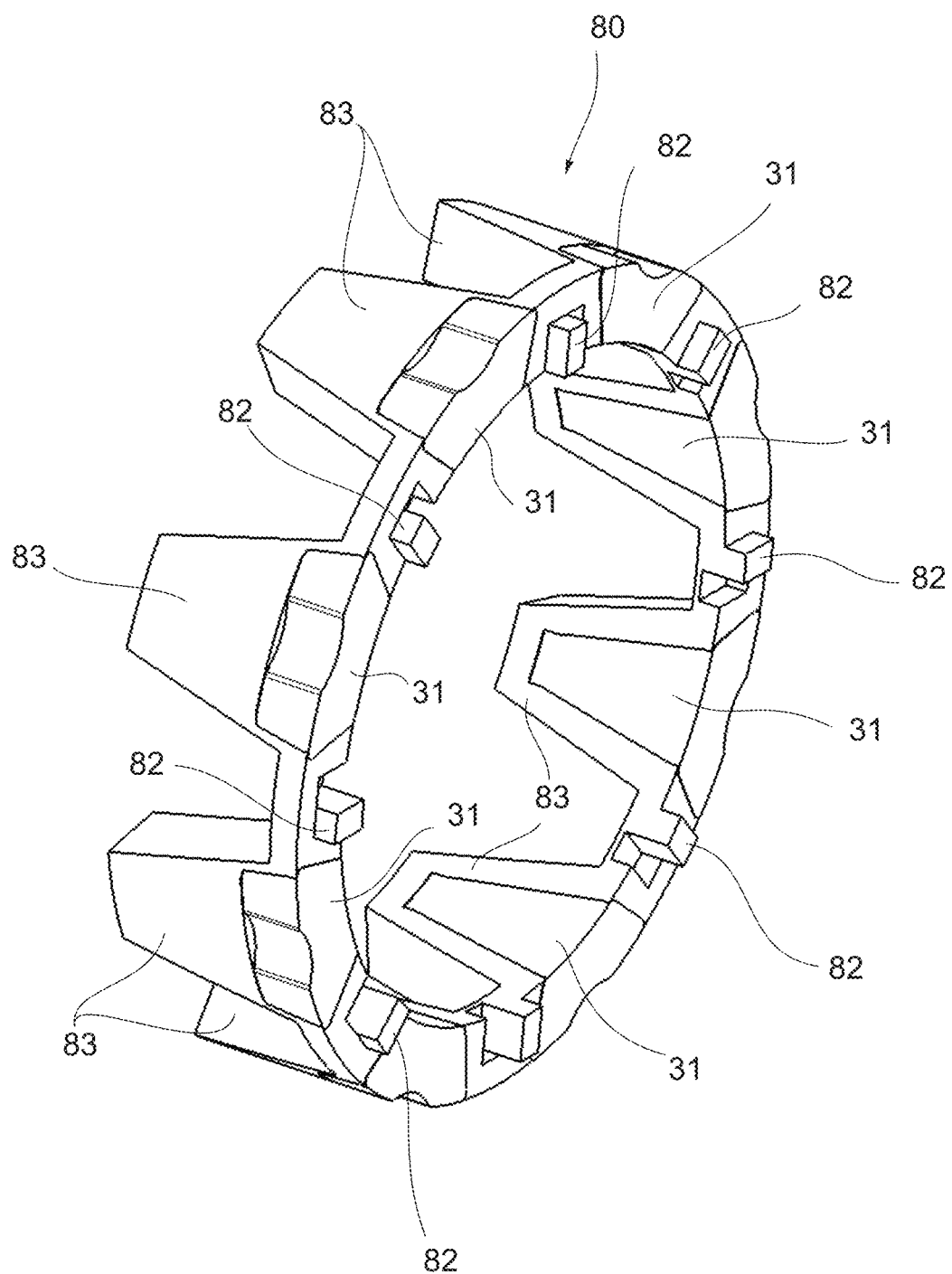
FIG. 30 is a perspective view of a resin holder integral with claws.
Figure 31:
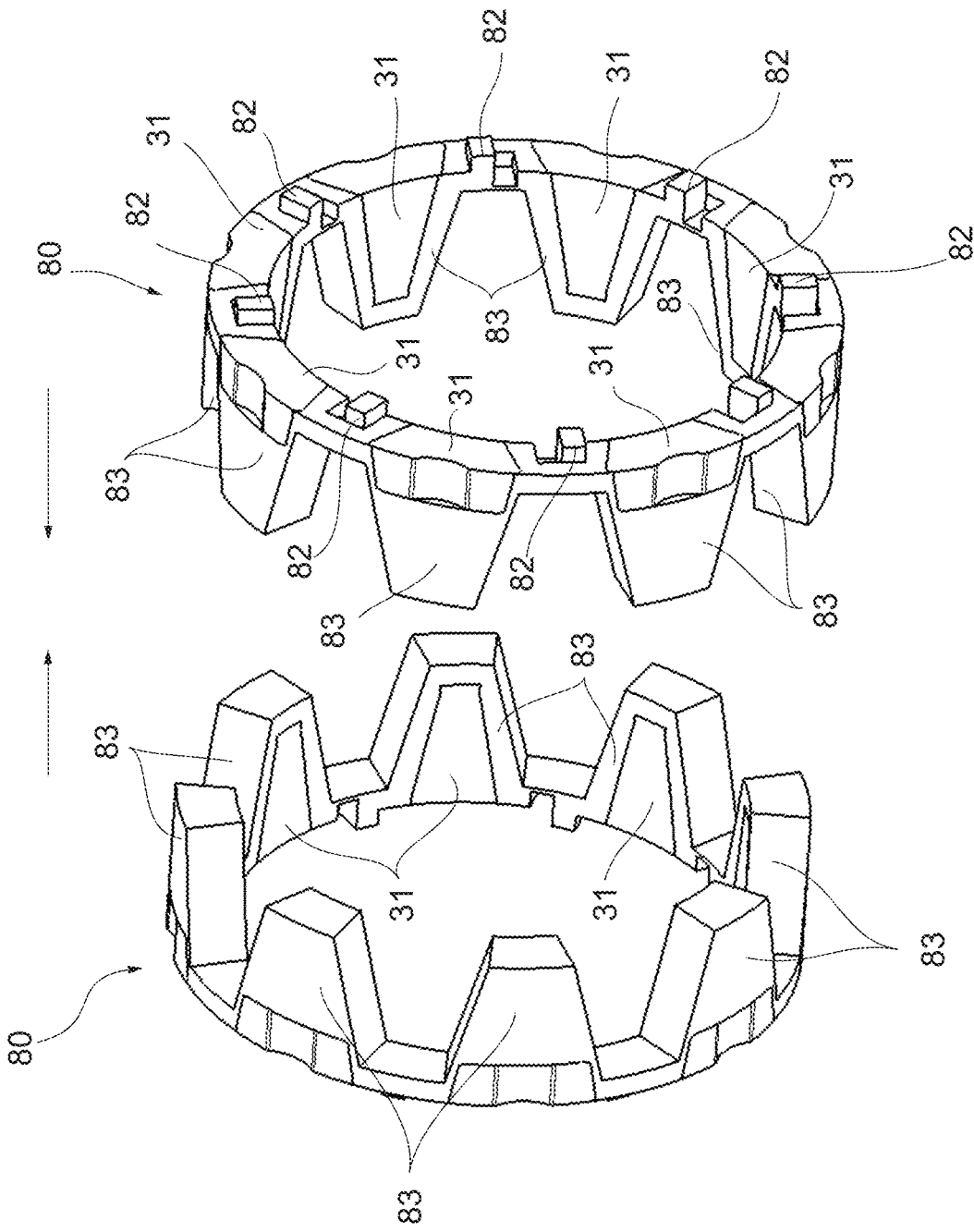
FIG. 31 is a perspective view of a pair of opposed resin holders before fitting.
Figure 32:
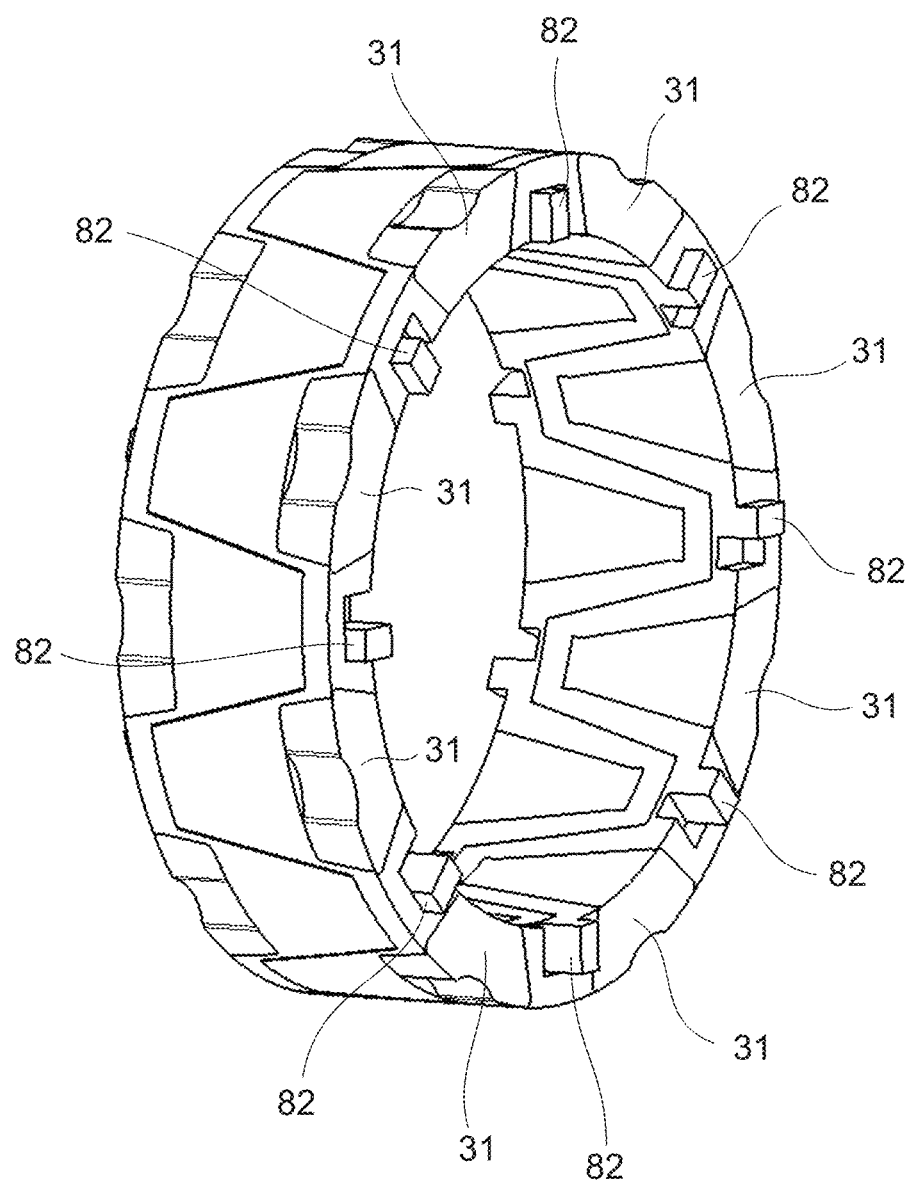
FIG. 32 is a perspective view of a pair of opposed resin holders after fitting.

To each of these protrusions 83, a claw 31, which is made of a compressed-powder member, is fixed or bonded for holding (see FIG. 29 and FIG. 30, for example).

Eighth Embodiment

Figure 33:
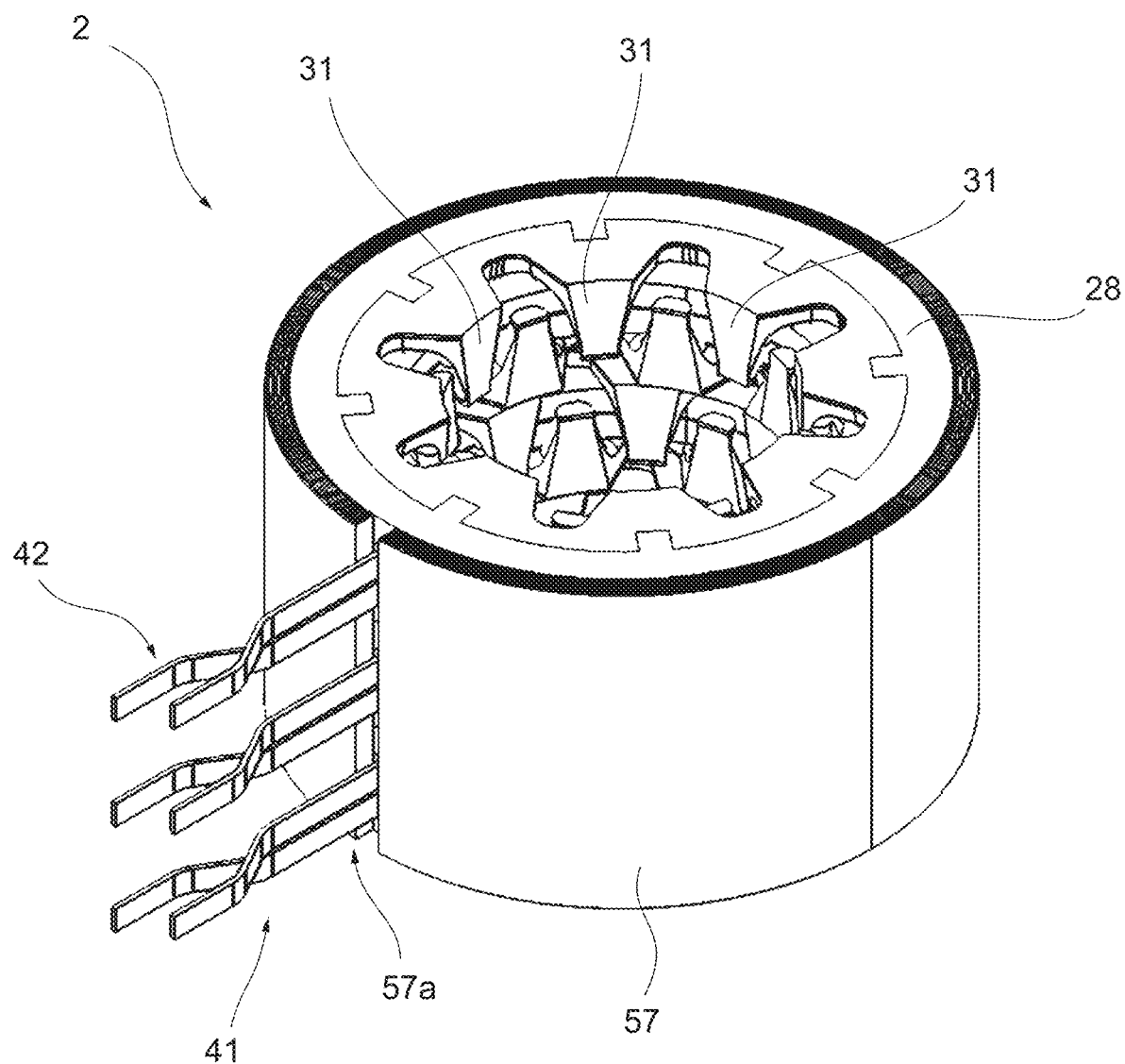
FIG. 33 is a perspective view of the appearance of a stator including a wound core therearound in an eighth embodiment.
Figure 34:
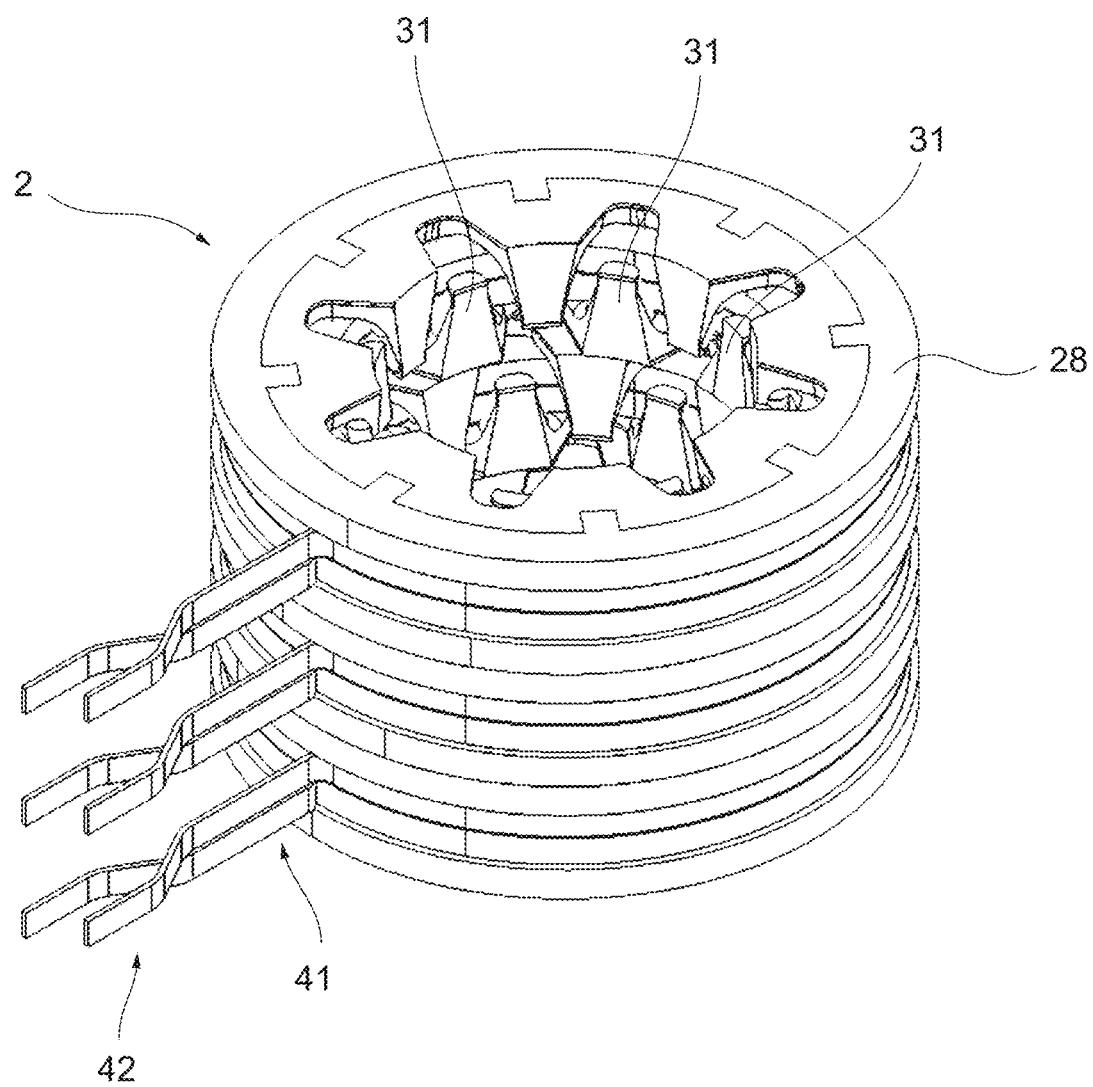
FIG. 34 is a perspective view of the interior of the stator in FIG. 33.
Figure 35:
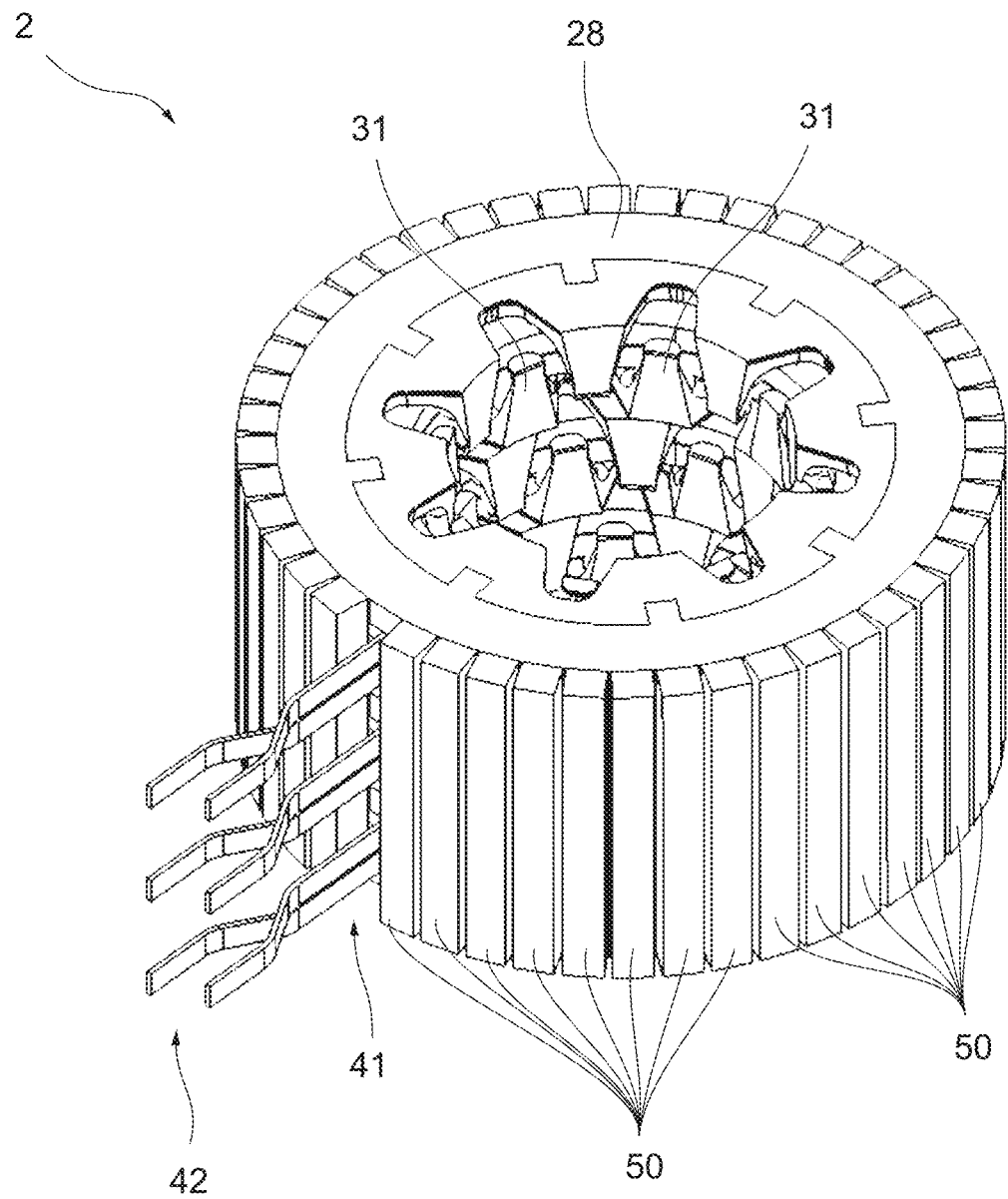
FIG. 35 is a perspective view of a stator including circumferentially segmented laminate cores that are arranged at regular intervals around the annular part.

A stator 2 of the present embodiment includes a part of the magnetic-path defining member up to the middle in the radial direction that is made of a compressed-powder member and the other part including (laminate core or wound core made of) a magnetic steel sheet (see FIG. 33 to FIG. 35). The stator 2 has a hybrid structure including the compressed-powder member having excellent degree of freedom in shape and the magnetic steel sheet having excellent magnetic properties. In other words, a radially inner part of the magnetic-path defining member is a compressed-powder member, and the outer part (annular part 32) includes a steel sheet.

The axially outer peripheral yoke parts may include a wound core 57 (see FIG. 33). Alternatively circumferentially segmented laminate cores (outer peripheral cores 50) may be arranged as the axial yoke parts at regular intervals around the annular part 32 having polygonal-shaped outer periphery (see FIG. 35). In one example, FIG. 35 shows the structure of 48-segmented laminate cores (outer peripheral cores 50), which may have another structure.

Similarly to the above embodiment, the claws 31 may be fixed or bonded to the resin holder 80. In one example, the resin holder 80 may be separately molded from the claws 31, and holds the claws 31 fitted in two axial directions to keep a predetermined circumferential angle of the claws 31 and a predetermined distance between the facing claws 31.

INDUSTRIAL APPLICABILITY

The present invention is suitable for applications to polyphase claw pole motors as well as to various types of industrial machines or various types of drive systems, such as electric power steering, including such a motor as the driving source, and to a vehicle equipped with the above-mentioned motors, machines and systems.

What is claimed is:

1. A polyphase claw pole motor comprising a stator that includes: a compressed-powder member formed of a compression molded product of magnetic powder; and a metal member, wherein:

at least claws of a claw pole of the stator are constituted by the compressed-powder member;

a part or an entire of an annular part located on a radially outer side of the claws of the claw pole is constituted by the metal member; and a plurality of the annular parts are disposed in an axial direction of the polyphase claw pole motor, the polyphase claw pole motor further comprises a magnetic-path defining member to form a magnetic path in the axial direction between the plurality of annular parts, the magnetic-path defining member including an outer peripheral core disposed on a radially outer side of the annular part;

the outer peripheral core is formed of a soft-magnetic sheet;

the soft-magnetic sheet is formed of laminated sheets stacked in a circumferential direction of the polyphase claw pole motor; and the claw pole has a flat surface on an outer peripheral surface, and the outer peripheral core has a contact surface extending in the axial direction so as to be in contact with the flat surface, the contact surface and the outer peripheral surface of the claw pole having mutually engaging shapes.

2. The polyphase claw pole motor according to claim 1, wherein the outer peripheral core extends in the axial direction as well as in a radial direction, and the outer peripheral core has the contact surface on an inner peripheral surface in the radial direction.

* * * * *